(12) United States Patent
van Baarsen et al.

(10) Patent No.: US 10,122,998 B2
(45) Date of Patent: Nov. 6, 2018

(54) REAL TIME SENSOR AND METHOD FOR SYNCHRONIZING REAL TIME SENSOR DATA STREAMS

(71) Applicant: Seiko Epson Corporation, Tokyo (JP)

(72) Inventors: John Peter van Baarsen, Delta (CA); Michael Joseph Mannion, Newmarket (CA); Kevin Gillett, Surrey (CA); Donald Gordon Wait, Surrey (CA); Keith Gillett, Delta (CA); Jimmy Kwok Lap Lai, Vancouver (CA); Alexander Burton, Victoria (CA)

(73) Assignee: SEIKO EPSON CORPORATION, Tokyo (JP)

( * ) Notice: Subject to any disclaimer, the term of this patent is extended or adjusted under 35 U.S.C. 154(b) by 520 days.

(21) Appl. No.: 15/009,158

(22) Filed: Jan. 28, 2016

(65) Prior Publication Data

US 2016/0323565 A1    Nov. 3, 2016

Related U.S. Application Data

(60) Provisional application No. 62/154,834, filed on Apr. 30, 2015.

(51) Int. Cl.
| | |
|---|---|
| *G01C 3/08* | (2006.01) |
| *H04N 13/296* | (2018.01) |
| *H04N 5/77* | (2006.01) |
| *H04N 9/82* | (2006.01) |
| *G06T 7/593* | (2017.01) |
| *H04N 13/254* | (2018.01) |
| *H04N 13/271* | (2018.01) |

(Continued)

(52) U.S. Cl.
CPC ........... *H04N 13/296* (2018.05); *G06T 7/593* (2017.01); *H04N 5/77* (2013.01); *H04N 9/8211* (2013.01); *H04N 9/8227* (2013.01); *H04N 13/239* (2018.05); *H04N 13/254* (2018.05); *H04N 13/271* (2018.05); *G06T 2207/10012* (2013.01); *G06T 2207/10028* (2013.01); *H04N 5/2256* (2013.01); *H04N 2013/0092* (2013.01)

(58) Field of Classification Search
CPC ..... H04N 13/0296; H04N 5/2256; H04N 5/76
USPC ....................................................... 356/5.01
See application file for complete search history.

(56) References Cited

U.S. PATENT DOCUMENTS

| | | | | |
|---|---|---|---|---|
| 6,340,991 B1* | 1/2002 | Chen | ......................... | G06T 7/20 348/513 |
| 8,566,071 B2* | 10/2013 | Shumaker | ................ | G09B 9/12 434/31 |

(Continued)

*Primary Examiner* — Mark Hellner
(74) *Attorney, Agent, or Firm* — Oliff PLC

(57) ABSTRACT

A Holocam Orb system uses multiple Holocam Orbs (Orbs) within a real-life environment to generate an artificial reality representation of the real-life environment in real time. Each Orb is an electronic and software unit that includes a local logic module, a local CPU and multiple synchronous and asynchronous sensors, include stereo cameras, time-of-flight sensors, inertial measurement units and a microphone array. Each Orb synchronizes itself to a common master clock, and packages its asynchrony data into data bundles whose timings are matched to frame timing of synchronous sensors, and all gathered data bundles and data frames are given a time stamp using a reference clock common to all Orbs. The overlapping sensor data from all the Orbs is combined to create the artificial reality representation.

20 Claims, 14 Drawing Sheets

(51) Int. Cl.
  *H04N 13/239* (2018.01)
  *H04N 5/225* (2006.01)
  *H04N 13/00* (2018.01)

(56) References Cited

U.S. PATENT DOCUMENTS

2014/0111616 A1* 4/2014 Blayvas ............. G01B 11/2513
                                                        348/46
2014/0355947 A1* 12/2014 Slamecka ................ H04N 5/91
                                                        386/201

* cited by examiner

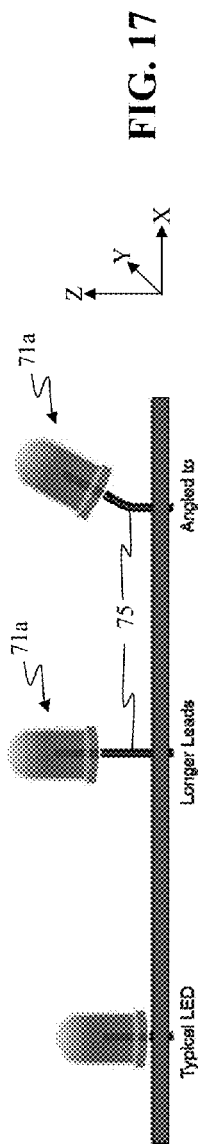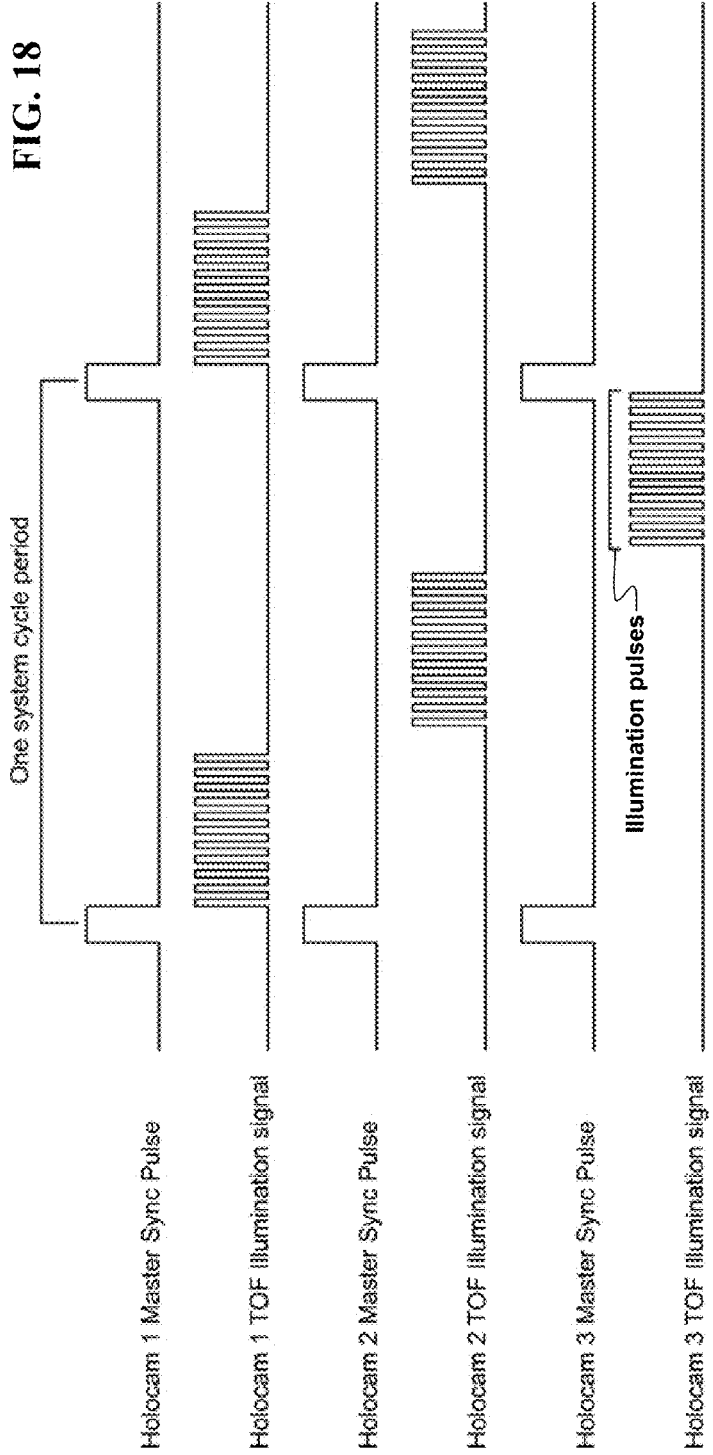

REAL TIME SENSOR AND METHOD FOR SYNCHRONIZING REAL TIME SENSOR DATA STREAMS

CROSS-REFERENCE TO RELATED APPLICATION(S)

This application claims the benefit of priority under 35 U.S.C. § 119(e) on U.S. Provisional Application No. 62/154,834, filed on Apr. 30, 2015, and entitled "Method for Synchronizing Real Time Sensor Data Streams". The aforementioned patent document is incorporated by reference herein in its entirety.

BACKGROUND

Field of Invention

The present invention relates to the fields of virtual reality and augmented reality. More specifically it relates to a system/method of using multiple sensors to create a real-time, three-dimensional computer simulation/emulation/model of a real, local environment into which computer generated objects may be inserted to create an augmented reality (or virtual reality) scene.

Description of Related Art

Virtual reality, or artificial reality, which may include augmented reality, relates to the use of computers and three-dimensional (3D) imaging techniques to create a 3D representation within a computer of a real-life (or seemingly real-life) scene. Various 3D observation tools may be used. Examples of such observation tools may include stereo imaging equipment (e.g. 3D cameras) or time-of-flight capturing units, which may use infrared sensors or laser sensors to obtain 3D depth information.

Typically, one wishes to anchor computer generated 3D items to a video (or still) image portrayal of the generated 3D items within an imaged (3D or two-dimensional, 2D) scene. This may require much preprocessing to determine pose, position and orientation of the computer generated 3D items and to identify their corresponding pixels in the video (or still) image that represents the same 3D item within the imaged (preferably real-life) scene. As a result, it has heretofore been very difficult, and indeed not practical, to produce renditions of computer generated 3D items within real-life scene images in real time.

SUMMARY OF INVENTION

It is an object of the present invention to provide a multi-sensing apparatus/system/method for generating virtual reality scenes in real time.

It is a further object of the present invention to provide a multi-sensing apparatus/system/method for synchronizing multiple 3D capture devices and their respective captured data to generate a virtual reality environment in real time that encompasses a viewer and provides a surrounding field-of-view for the viewer.

The present objects are met in a sensing apparatus that incorporates multiple sensors, both synchronous sensors and asynchronous sensor, and packages the continuous data from the asynchronous sensors into data bundles time-synchronized to data frames provided by the synchronous sensors. Examples of synchronous sensors include streaming video devices/cameras (such as RGB video sensors) and time-of-flight (TOF) sensors that collect depth information at synchronized intervals. Preferably, the synchronous sensors have an internal clocking system that can be slaved to an external clock source. That is, they have a trigger (or actuating) input, which may actuate the start of a data recording cycle for the synchronous sensor. The trigger input accepts an external signal to synchronously align the synchronous sensor's data flow to the external clock source. In the example of RGB video sensors, their VSync signal, which indicates the completion of the capturing of a current image frame and the start of the next image frame, may be used as an input to accept the external clock source and thus be synchronize to (i.e. controlled by) the external clock source. Although time-of-flight (TOF) sensors might not have a VSync signal, a TOF sensor's synchronous data-capture signal, which triggers the start of a data capturing sequence, may be used to accept an external signal to align their data flow to the external clock source. In a preferred embodiment, the TOF sensors' synchronous data-capture signal is preferably tied to (i.e. triggered by) the RGB sensors' same VSync signal so as to provide TOF data in data frames similar to, and in synchronism with, the RGB sensors' image frames.

Examples of asynchronous sensors types include Inertial Measurement Units (IMUs), temperature sensors, magnetic field strength sensors, magnetic field alignment sensors, and other sensor that generate a continuous stream of live data from their environment, and do not accept external signals to align their data flow to an external clock source. In this case, the present invention groups asynchronous streaming data from asynchronous sensors (such as data from inertial sensors) into segments (i.e. data bundles) of time duration similar to, and in synchronism with, synchronous time-packaged data (such as video frame data), and gives them a time stamp matching the timestamp of their synchronized image frame. In this manner, the asynchronous data groups are bundled with corresponding video frame data, and have matching time stamps.

Additionally, full-duplex data communication (or computer network cabling) is used to synchronize a master clock pulse among multiple independent sensing apparatuses (each of which has both asynchronous and synchronous data recoding sensors/components) so that the grouping and bundling of asynchronous and synchronous data is synchronized across all the independent sensing apparatuses. In this manner, the recording data from all the independent sensing apparatuses (or recording devices) may be shared with each other or sent to a master computer to create a real-time 3D image of a local environment.

The above objects are met in an environment sensing apparatus, including: at least one synchronous sensor characterized by: (a) having a trigger input that actuates a start of a synchronous-data gathering cycle that captures first sensor data, and synchronously aligns its synchronous-data gathering cycle to the trigger input; (b) organizing the first sensor data captured during each synchronous-data gathering cycle into a corresponding data frame, and (c) issuing a frame-completion signal in response to completion of each data frame; at least one asynchronous sensor characterized by generating a continuous stream of second sensor data and lacking any input for aligning its second sensor data to any external clock source; and a first memory spaced and a second memory space, both first memory space and second memory space being coupled to selectively store second sensor data from the at least one asynchronous sensor; wherein: both the first memory space and second memory spaced are responsive to the frame-completion signal of the at least one synchronous sensor, the first memory space and second memory space are configured to alternate operation in accordance with the frame-completion signal, and only one of the first memory space and second memory space stores second sensor data from the at least one asynchronous sensor at a time to define discrete second sensor data groups each corresponding to a separate data frame in accordance with the frame-completion signal; and each data frame from the least one synchronous sensor is bundled with its corresponding second sensor data group stored in one of the first and second memory spaces to define a data frame bundle, and the defined data frame bundles are output from the environment sensing apparatus.

Preferably, the environment sensing apparatus according further includes a first video sensor and a second video sensor, each of the first video sensor and second video sensor being one of the at least one synchronous sensor; a time-of-flight (TOF) sensor having an actuation input that triggers the TOF sensor to start a TOF-data gathering cycle; wherein the actuation input of the TOF sensor, the trigger input of the first video sensor, and the trigger input of the second video sensor are coupled to response to a clocking source, in common; wherein: the first video sensor and second video sensor are spaced apart to define a stereoscopic image sensor pair that together captures stereoscopic pairs of 2D images, the stereoscopic image sensor pair having a first field-of-view (FOV); and the TOF sensor is positioned between the spaced apart first video sensor and second video sensor, and the TOF sensor is aimed in the direction of the first FOV.

Further preferably, the TOF sensor defines a 3D point cloud, and points within the 3D point cloud are associated with corresponding pixels in captured stereoscopic pairs of 2D images.

Additionally, the at least one asynchronous sensor may be an Inertial Measurement Unit (IMU), temperature sensor, magnetic field strength sensor, or magnetic field alignment sensor.

Further preferably, the frame-completion signal is a VSync signal that signals the capturing of a current image frame by at least one of the first video sensor and second video sensor.

Additionally, the this embodiment may further include a circuit board having an array of light emitting diodes (LEDs), each LED having an illuminating head supported over a surface of the circuit board on at least one connection lead spanning from the illumination head to a drill hole in the circuit board, the illuminating head being aimed at a predefined angle relative to the surface of the circuit board and the drill hole being at the same predefined angle in the circuit board, the predefined angle not being perpendicular to the surface of the circuit board.

The above objects are also met in an environment sensing system including a plurality of the above-described environment sensing apparatuses, and further including: a master clock distributed to all of the plurality of environment sensing apparatuses, each environment sensing apparatus coupling its received master clock to its respective trigger input so as to substantially synchronize a simultaneous operation of its respective first video sensor, second video sensor, and TOF sensor with the operation of the first video sensor, second video sensor, and TOF sensor of all other of the environment sensing apparatuses; wherein the internal issuance of the VSync signal within each environment sensing apparatus is substantially simultaneous across all environment sensing apparatuses, and the creation of data frame bundles across all environment sensing apparatuses is likewise simultaneous.

In this case, is preferred that each environment sensing apparatus within the environment sensing system further include: an array of light emitting diodes (LEDs) operational for a predefined sub-period, the predefined sub-period being a fraction a full period defined as a time of one TOF-data gathering cycle, the predefined sub-period being further characterized by a time offset from the beginning of each TOF gathering cycle; wherein the time offset of each environment sensing apparatus is different and selected to prevent any two environmental sensing apparatus from having their respective array of light emitting diodes operational at the same time.

Additionally, the FOV of each environment sensing apparatus may have a partially overlapping FOV segment in common with all other environment sensing apparatuses in the environment sensing system; and within each environment sensing apparatus, its data frame bundles exclude any sensor data not corresponding to the overlapping FOV segment.

If desired, each environment sensing apparatus may further include a data processing unit; and within each environment sensing apparatuses, the overlapping FOV segment may be defined by an upper boundary imaging cut-off line, a lower boundary imaging cut-off line, a left boundary imaging cut-off line, and a right boundary imaging cut-off line; and within each environment sensing apparatus, its data processing unit defines a respective upper boundary imaging cut-off line, a lower boundary imaging cut-off line, a left boundary imaging cut-off line, and a right boundary imaging cut-off line by a sequence of steps including: (a) all imaging sensors of each respective, individual environment sensing apparatus are calibrated to identify their respective, local common top, bottom, left and right boundaries defining a local, common FOV (active FOV) for each imaging sensors of the individual environmental sensing apparatus; (b) from the active FOV, define an active left boundary, active right boundary, active top boundary and active bottom boundary corresponding to the active FOV each sensor from its center to each active boundary, define each image sensor's total FOV from the center of each sensor; (c) for all participating imaging sensors, for each of a top, bottom, left and right boundary, each selected in turn, the imaging sensor that has the lowest active FOV angle from the imaging sensor to the currently selected boundary is selected as the limiting value for all participating imaging sensors; (d) the active FOV is adjusted according to the determined limiting values for the boundaries; (e) determine a ratio of the active FOV to the full FOV for each imaging sensor's boundary; (f) use the ratio of step (e) to calculate a number of pixels to truncate from each imaging sensor's view boundary, this number of pixels to truncate being a respective pixel offset for each imaging sensor's view boundary; and (g) store each imaging sensor's respective pixel offsets into an truncate memory space associated with each imaging sensor.

Preferably, each data frame bundle created within a respective environment sensing apparatus is given a respective time stamp, and the data frame bundles across all environment sensing apparatuses in the environment sensing system that are constructed in unison are given the same time stamp; and all environmental sensing apparatuses within the environment sensing system are connected via a computer network.

Further preferably, each environment sensing apparatus forwards its data frame bundles to another environment sensing apparatus in the environment sensing system.

The environment sensing system may further have a central computer system connected to the computer network, wherein: each environment sensing apparatus forwards its data frame bundles to the central computer system;

and the central computer system coordinates all incoming data frame bundles according to their respective time stamps.

Desirably, each environment sensing apparatus is an independent three-dimensional (3D) sensing apparatus including multiple 3D sensors; and the environment sensing system is part of an augmented reality system.

The above objects are further met in an augmented reality system including: a computer network; a central computer coupled to the computer network; and a plurality of independent three-dimensional (3D) sensing apparatuses, each coupled to the computer network, wherein each 3D sensing apparatus includes: (i) stereoscopic image sensor pair including first video sensor spaced apart from a second video sensor configured to capture stereoscopic pairs of 2D images, the stereoscopic image sensor pair having a first field-of-view (FOV), the first and second video sensors being responsive to a trigger input, in common, that actuates the start of a stereoscopic image capture sequence capture one 3D image frame, and stereoscopic image sensor pair issuing a VSync signal at the completion of each captured 3D image frame; (ii) a time-of-flight (TOF) sensor having an actuation input that triggers the TOF sensor to start a TOF-data gathering cycle to collect TOF data, the actuation input of the TOF sensor being tied to the trigger input of the stereoscopic image sensor pair, the TOF data gathered during one 3D image frame being termed a TOF frame, the TOF sensor being aimed in the direction of the first FOV; (iii) at least one asynchronous sensor characterized by generating a continuous stream of asynchronous sensing data and lacking any input for aligning its asynchronous sensing data to any external clock source; (iv) a first memory spaced and a second memory space, both first memory space and second memory space being coupled to selectively store asynchronous sensing data from the at least one asynchronous sensor, the first memory space and second memory space being configured to alternately store asynchronous sensing data from the at least one asynchronous sensor in accordance with the VSync signal to define discrete asynchronous data groups each corresponding to a different 3D image frame, in accordance with the VSync signal; and (v) a data processing unit configured to provide a time stamp, in common, to each 3D image frame, TOF frame, and asynchronous data group in response to the VSync signal, and to collect the 3D image frames, TOF frames, and asynchronous data groups into data frame bundles in accordance with their common time stamps, and to output the collected data frame bundles to the central computer over the computer network.

Further preferably, the TOF sensor defines a 3D point cloud, and points within the 3D point cloud are associated with corresponding pixels in captured stereoscopic pairs of 2D images.

Desirably, at least one asynchronous sensor is an Inertial Measurement Unit (IMU), temperature sensor, magnetic field strength sensor, or magnetic field alignment sensor.

It is further preferred that the augmented reality system include a master clock distributed over the computer network to all 3D sensing apparatuses, wherein each 3D sensing apparatus couples its received master clock to its respective trigger input; wherein the internal issuance of each 3D sensing apparatus's Vsync signal is substantially simultaneous across all 3D sensing apparatus, and time stamps of simultaneously created data frame bundles across all 3D sensing apparatus are the same.

Optionally, each 3D sensing apparatus may further include: an array of light emitting diodes (LEDs) operational for a predefined sub-period, the predefined sub-period being a fraction a full period defined as a time of one TOF-data gathering cycle, the predefined sub-period being further characterized by a time offset from the beginning of each TOF gathering cycle; wherein the time offset of each 3D sensing apparatus is different and selected to prevent any two 3D sensing apparatus from having their respective array of light emitting diodes operational at the same time.

Further preferably, the FOV of each 3D sensing apparatus has a partially overlapping FOV segment in common with all other 3D sensing apparatus; and within each 3D sensing apparatus, its data frame bundles exclude any sensor data not corresponding to the overlapping FOV segment.

Other objects and attainments together with a fuller understanding of the invention will become apparent and appreciated by referring to the following description and claims in conjunction with the accompanying drawings.

BRIEF DESCRIPTION OF THE DRAWINGS

In the drawings wherein like reference symbols refer to like parts.

FIG. 17 illustrates an LED installation method, wherein LEDs are installed with longer than typical pin leads and angled (i.e. bent) in order to have the LEDs point in multiple directions in a scene.

FIG. 18 shows time division multiplexing of illumination sources to assure that no two Holocam Orbs activate their IR illumination array at the same time.

DESCRIPTION OF THE PREFERRED EMBODIMENTS

The present, real-time, artificial/augmented reality generating system/method is herein termed a "Holocam Orb System" because of its use of what are herein termed "Holocam Orbs", each of which is an independent data gathering device (i.e. independent sensing apparatus incorporating multiple sensors) that gathers (real-life) scene information (preferably including audio data and 2D/3D imaging data) from its respective field-of-view (FOV). Information from multiple Holocam Orbs is combined within a computing system (e.g. a general purpose computer or a specialized computer or other data processing device) to create a multi-view 3D artificial reality scene that may surround a viewer standing within the scene.

Figure 1:
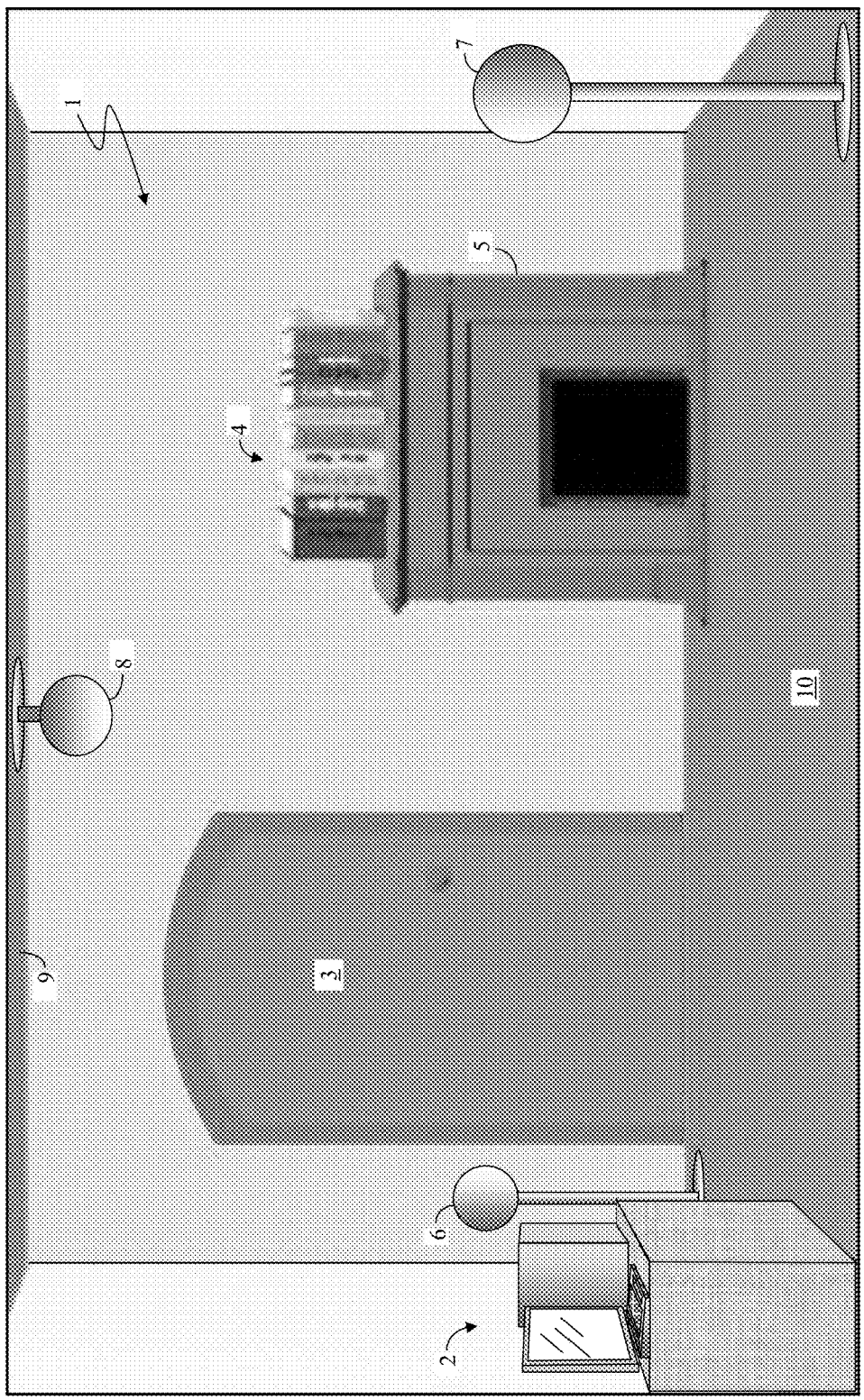
FIG. 1 is an illustration of a real-world scene with three Holocam Orbs (3D capture devices) used to capture 3D information and produce a real-time, 3D virtual environment of the real-world scene.

For example, FIG. 1 illustrates an exemplary, real-world scene consisting of a room 1 with a computer 2, a door 3, and books 4 on a chimney 5. Additionally, three figuratively illustrated Holocam Orbs 6, 7, and 8 are shown distributed within room 1. Holocam Orb 6 preferably gathers scene information from a field-of-view generally extending from a side of door 3 toward the foreground of the room 1. Holocam Orb 7 is positioned at an opposite side of room 1 and may gather information from a field-of-view looking back from the foreground of room 1 toward the wall where the door 3 and chimney 5 are located. Holocam Orb 8 is position on the ceiling 9 and it preferably provides 3D scene information from a field-of-view extending from the ceiling 9 downward toward the floor 10. It is to be understood, however, that each Holocam Orb may be have multiple 3D observation tools distributed along its surface so as to alternatively provide a substantially spherical 360 degree field-of-view. As is described more fully below, information from all Holocam Orbs 6, 7 and 8 is combined within a computing system, or base station, such as computer 2, to generate a 3D artificial reality scene of room 1 from multiple perspectives. Preferably, Holocam Orb 6 provides information from the back of room 1 toward the front (i.e. the foreground in FIG. 1), Holocam Orb 7 provides information from the front of room 1 toward the back, and Holocam Orb 8 providing information from above toward the floor. A person, i.e. viewer, positioned within room 1 and viewing the generate 3D artificial reality scene would experience an immersive artificial reality scene surrounding him and adjusting itself to the viewer's physical movements. It is to be understood that additional Holocam Orbs may be added to provide additional information from other FOVs to create an even greater encompassing experience. Holocam orbs 6, 7, and 8 may communicate with computer (or computer system) 2 using wired or wireless communication, but are preferably linked by a wired, serial network communication system, as is explained more fully below.

The present discussion describes various aspects of the Holocam Orb System, and is divided into multiple sections. Each section details some unique aspects of the present system. For ease of discussion, a Holocam Orb may hereafter alternatively be termed an "Orb".

Each Holocam Orb, such as figuratively illustrated Orbs 11, 13 and 15 of FIG. 1, is an electronics and software device that gathers sensor data from a three dimensional area (or scene), processes and timestamps the data, and presents it to other devices (e.g. base station, computer system, or other Orbs) in a Holocam Orb System/Installation for further processing in real time. A Holocam Orb System is thus preferably comprised of multiple Holocam Orbs.

Examples of sensor data gathering devices include 2D imaging devices, 3D imaging/sensing devices, and audio sensing devices. Examples of 3D imaging/sensing devices may include stereo imaging equipment (e.g. 3D cameras) and time-of-flight capturing units, which may use infrared sensors or laser sensors to obtain 3D depth information, such as a 3D laser scanner, a MICROSOFT CORP. KINECT sensor, and a range camera. A preferred example of a time-of-flight capturing unit may be a time-of-flight camera (TOF camera), which is a range imaging camera system that resolves distance based on the known speed of light, measuring the time-of-flight of a light signal between the time-of-flight camera and a subject for each point of an image. To resolve distances, a time-of-flight camera may use radio frequency (RF)-modulated light sources with phase detectors, range gated imagers, or direct time-of-flight imagers using lasers, for example. 3D cameras rely on correlating image date in a stereoscopic pair of 2D images to determine distance information. For the sake of completeness, before discussing a preferred construct of a Halocam Orb System in accord with the present invention, principles of stereo image capturing are first discussed.

The presently preferred embodiment makes use of a point cloud, which is a collection of points in three-dimensional space that define the surface of a 3D object. In a preferred embodiment, it is further desirable that the points of the 3D point cloud be correlated to individual points (e.g. pixels) on a captured image (or shape outline of the object within the captured image), such as a 2D image of an object in a scene.

As is mentioned above, a 3D image may be generated from a stereo pair of 2D images (i.e. a stereoscopic (or stereo) image pair). Each of the two 2D images in a stereoscopic image pair is produced by a respective one of two 2D imaging cameras spaced apart to provide two views (i.e. two fields-of-view, FOV, or angle views) of a common scene. By means of stereo constraints, point (or pixel) information of corresponding pixels in the two views is combined to create a perspective (i.e. 3D) view, which includes point cloud information. Thus, a point cloud generated from a stereoscopic image pair intrinsically includes a correlation between points of the point cloud and points (e.g. pixels or regions) in the two 2D images of the stereoscopic image pair. Consequently, for ease of implementation a preferred embodiment of the present invention makes use of a first point cloud generated from a stereo pair of 2D images, and further correlates points in this first point cloud to points in a second point cloud created with a time-of-flight capturing unit (or module). For the sake of completeness, therefore, a brief discussion of a stereo image pair (i.e. a stereoscopic image pair) is herein provided.

In order to extract 3D information from a stereoscopic image pair, one first needs to be able to identify commonly imaged items in the stereoscopic image pair. A common way to do this is to calibrate the two cameras, and to identify a known point of reference in a specific scene. A less restrictive approach would eliminate the need to calibrate the cameras to a specific scene. However, since both images of the stereoscopic image pair provide different views of the common scene, this can be a difficult task. One needs to recognize different views of common objects in two 2D image scenes, and to correlate specific parts of the common objects.

An integral part of object recognition is pattern matching. An essential component of pattern matching in images (and particularly in 2D images) is feature detection, which refers to identifying parts of an image, or individual feature points of an image (such as individual pixels), that are good candidates for investigation to determine if they might be part of a sought after object in an image.

Various techniques are known for identifying characteristic features in an image that may be used to describe an imaged scene. Characteristic features may include distinguishing shapes or sections-of-an-image or individual points (i.e. pixels) of an image. For ease of discussion, the present example is described as using feature points (which include individual pixels); with the understanding that other characteristic features (and methods of identifying characteristic features) may also be used without deviating from the present invention.

As an example of how characteristic features may be used, if one has a library of identifying features that describe an object (such as obtained from a collection of training images (i.e. image samples) of the target object, or object type), then one may search an input test image for those identifying features in an effort to determine if an example of the target object is present in the input test image. This concept may be extended to matching common features of a common scene in multiple digital images of the common scene taken from different view angles (i.e. different FOVs) to index (e.g. match or correlate) feature points (i.e. pixels) from one image to another. This permits the combined processing of the multiple digital images.

Figure 2:
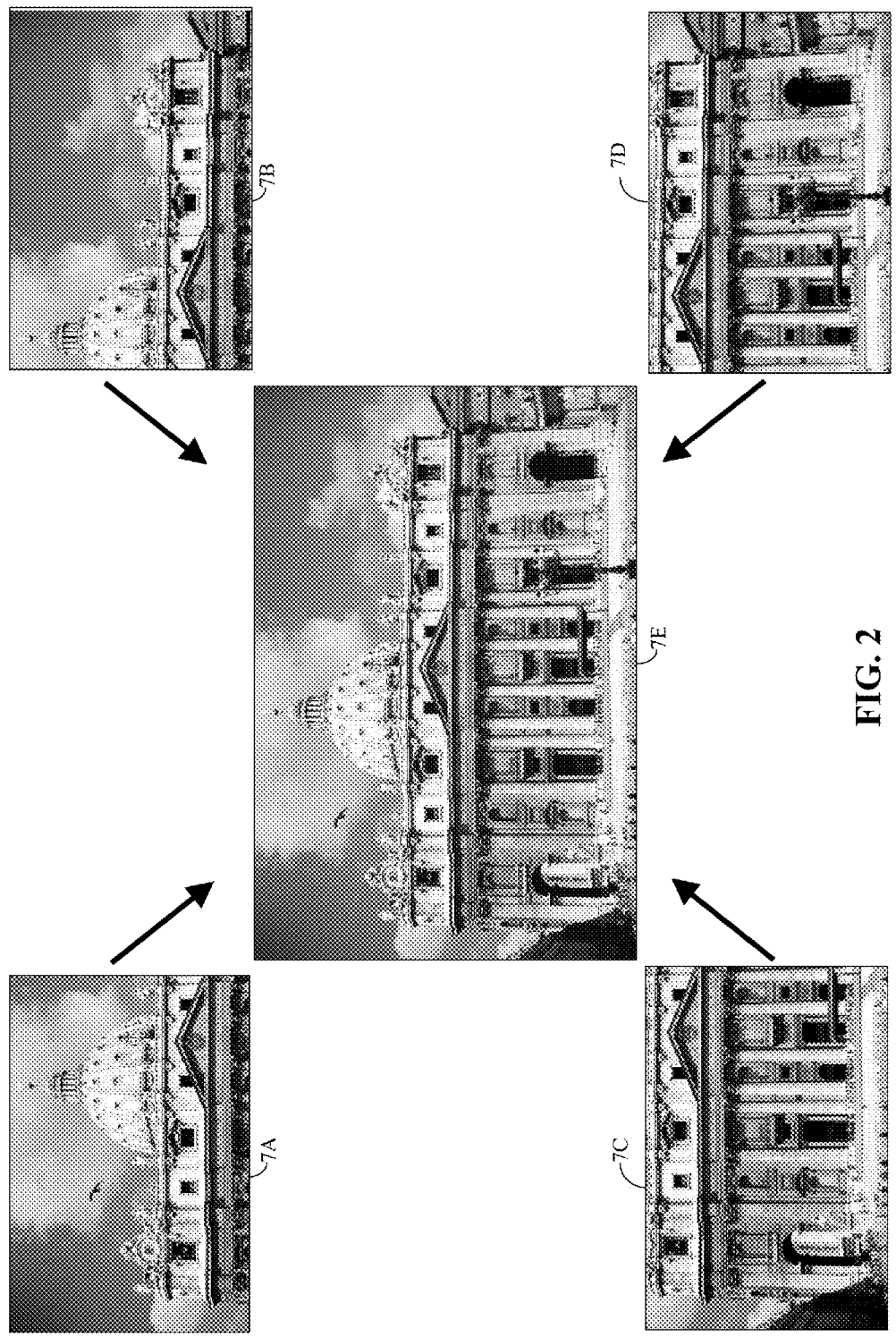
FIG. 2 illustrates the use of corresponding feature points in different images to stitch together the images to create a larger composite image.

For example in FIG. 2, images 7A, 7B, 7C and 7D provide partial, and overlapping, views of a building in a real-world scene, but none provide a full view of the entire building. By applying feature point detection and indexing (i.e. identifying matching pairs of) feature points in the four partial images 7A, 7B, 7C and 7D that correlate to the same real feature point in the real-world scene, it is possible to stitch together the four partial images (such as by applying an image stitching tool) to create one composite image 7E of the entire building. In the example of FIG. 1, the four partial images 7A, 7B, 7C and 7D are taken from a similar FOV (i.e. a frontal view), but this approach may be extended to the field of correspondence matching and applied to images taken from different FOV's.

Correspondence matching refers to the matching of objects or object features (or more typically the matching of feature points, such as individual pixels) common to two or more images. Correspondence matching tries to determine which parts of a first image correspond to (i.e. are matched to) what parts of a second image, assuming that the second image was taken after the camera that took the first image had moved, time had elapsed, and/or the captured subjects/objects had moved. For example, the first image may be of a real-world scene taken from a first view angle, defining a first field-of-view (i.e. FOV), and the second image may be of the same real-world scene taken from a second view angle defining a second FOV. Assuming that the first and second FOVs at least partially overlap, correspondence matching refers to the matching of common features points in the overlapped portions of the first and second images.

Assuming that a number of common image features, or objects or feature points, in two images taken from two view angles have been matched, epipolar geometry may then be used to identify a positional relationship between the matched image features to create a stereo view, or 3D reconstruction.

Epipolar geometry is basically the geometry of stereo vision. For example in FIG. 2, two cameras 11 and 13 create two 2D images 11A and 13A, respectively, of a common, real-world scene 18 consisting of a larger sphere 19 and a smaller sphere 21. 2D images 11A and 13A are taken from two distinct view angles 11C and 13C. Epipolar geometry describes the geometric relations between points in 3D scene 18 (for example spheres 19 and 21) and their relative projections in 2D images 11A and 13A. These geometric relationships lead to constraints between the image points, which are the basis for epipolar constraints, or stereo constraints, described more fully below.

Figure 3:
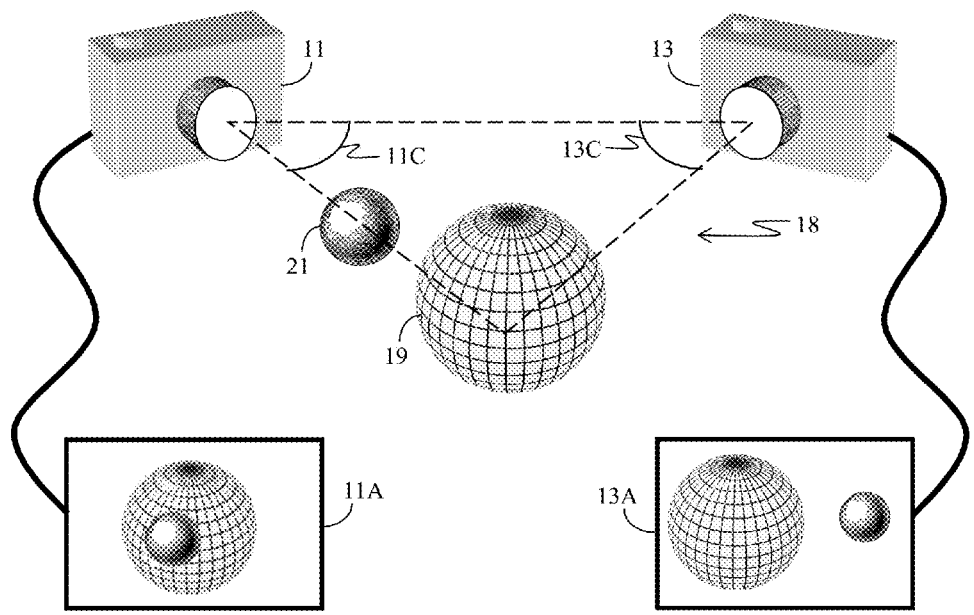
FIG. 3 illustrates the principles of Epipolar geometry.

FIG. 3 illustrates a horizontal parallax where, from the view point of camera 11, smaller sphere 21 appears to be in front of larger sphere 19 (as shown in 2D image 11A), but from the view point of camera 13, smaller sphere 21 appears to be some distance to a side of larger sphere 19 (as shown in 2D image 13A). Nonetheless, since both 2D images 11A and 13A are of the same real-world, 3D scene 18, both are truthful representations of the relative positions of larger sphere 19 and smaller sphere 21. The positional relationships between camera 11, camera 13, smaller sphere 21 and larger sphere 19 thus establish geometric constraints on 2D images 11A and 13A that permit one to reconstruct 3D scene 18 given only 2D images 11A and 13A, as long as the epipolar constraints (i.e. stereo constraints) are known.

Figure 4:
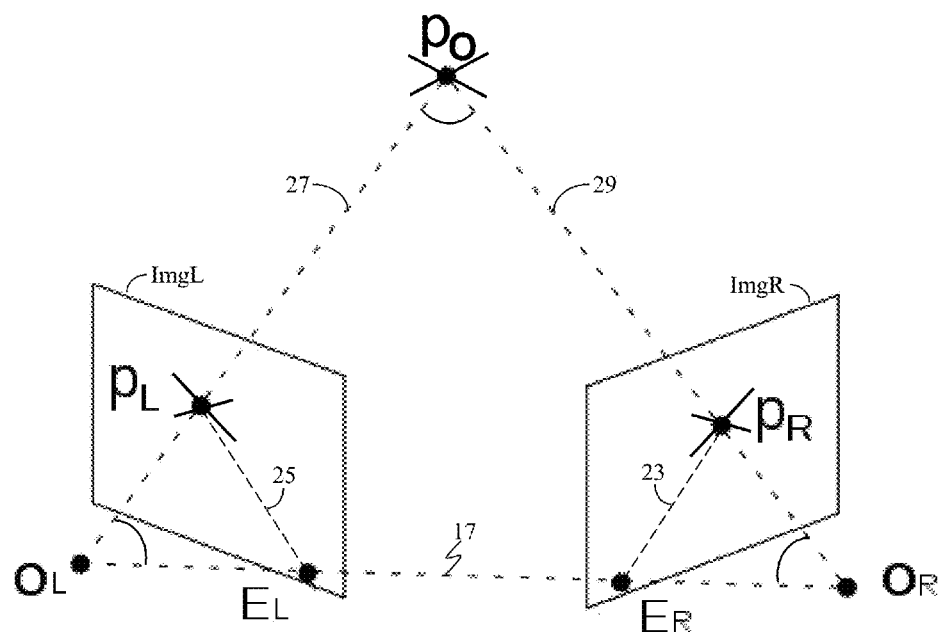
FIG. 4 is an example of defining stereo constraints using Epipolar geometry.

Epipolar geometry is based on the well-known pinhole camera model, a simplified representation of which is shown in FIG. 4. In the pinhole camera model, cameras are represented by a point, such as left point $O_L$ and right point $O_R$, at each respective camera's focal point. Point $P_O$ represents the point of interest (i.e. an object) in the 3D scene being imaged (i.e. captured), which in the present example is represented by two crisscrossed lines.

Typically, the image plane (i.e. the plane on which a 2D representation of the imaged 3D scene is captured) is behind a camera's focal point and is inverted. For ease of explanation, and to avoid the complications of a an inverted captured image, two virtual image planes, ImgL and ImgR, are shown in front of their respective focal points, $O_L$ and $O_R$, to illustrate non-inverted representations of captured images. One may think of these virtual image planes as windows through which the 3D scene is being viewed. Point $P_L$ is the 2D projection of point $P_O$ onto left virtual image ImgL, and point $P_R$ is the 2D projection of point $P_O$ onto right virtual image ImgR. This conversion from 3D to 2D may be termed a perspective projection, or image projection, and is described by the pinhole camera model, as it is known in the art. It is common to model this projection operation by rays that emanate from a camera and pass through its focal point. Each modeled emanating ray would correspond to a single point in the captured image. In the present example, these emanating rays are indicated by dotted lines 27 and 29.

Epipolar geometry also defines the constraints relating the positions of each camera relative to each other. This may be done by means of the relative positions of focal points $O_L$ and $O_R$. The focal point of a first camera would project onto a distinct point on the image plane of a second camera, and vise-versa. In the present example, focal point $O_R$ projects onto image point $E_L$ on virtual image plane ImgL, and focal point $O_L$ projects onto image point $E_R$ on virtual image plane ImgR. Image points $E_L$ and $E_R$ are termed epipoles, or epipole points. The epipoles and the focal points they project from lie on a single line, i.e. line 17.

Line 27, from focal point $O_L$ to point $P_O$, is seen as a single point $P_L$ in virtual image plane ImgL, because point $P_O$ is directly in front of focal point $O_L$. This is similar to how in image 11A of FIG. 3, smaller sphere 21 appears to be in front of larger sphere 19. However, from focal point $O_R$, the same line 27 from $O_L$ to point $P_O$ is seen a displacement line 23 from image point $E_R$ to point $P_R$. This is similar to how in image 13A of FIG. 3, smaller sphere 21 appears to be displaced to a side of larger sphere 19. This displacement line 23 may be termed an epipolar line. Conversely from focal point $O_R$, line 29 is seen as a single point $P_R$ in virtual image plane ImgR, but from focal point $O_L$, line 29 is seen as displacement line, or epipolar line, 25 on virtual image plane ImgL.

Epipolar geometry thus forms the basis for triangulation. For example, assuming that the relative translation and rotation of cameras $O_R$ and $O_L$ are known, if projection point $P_L$ on left virtual image plane ImgL is known, then the epipolar line 23 on the right virtual image plane ImgR is known by epipolar geometry. Furthermore, point $P_O$ must projects onto the right virtual image plane ImgR at a point $P_R$ that lies on this specific epipolar line, 23. Essentially, for each point observed in one image plane, the same point must be observed in another image plane on a known epipolar line. This provides an epipolar constraint that corresponding image points on different image planes must satisfy.

Another epipolar constraint may be defined as follows. If projection points $P_L$ and $P_R$ are known, their corresponding projection lines 27 and 29 are also known. Furthermore, if projection points $P_L$ and $P_R$ correspond to the same 3D point $P_O$, then their projection lines 27 and 29 must intersect precisely at 3D point $P_O$. This means that the three dimensional position of 3D point $P_O$ can be calculated from the 2D coordinates of the two projection points $P_L$ and $P_R$. This process is called triangulation.

Figure 5:
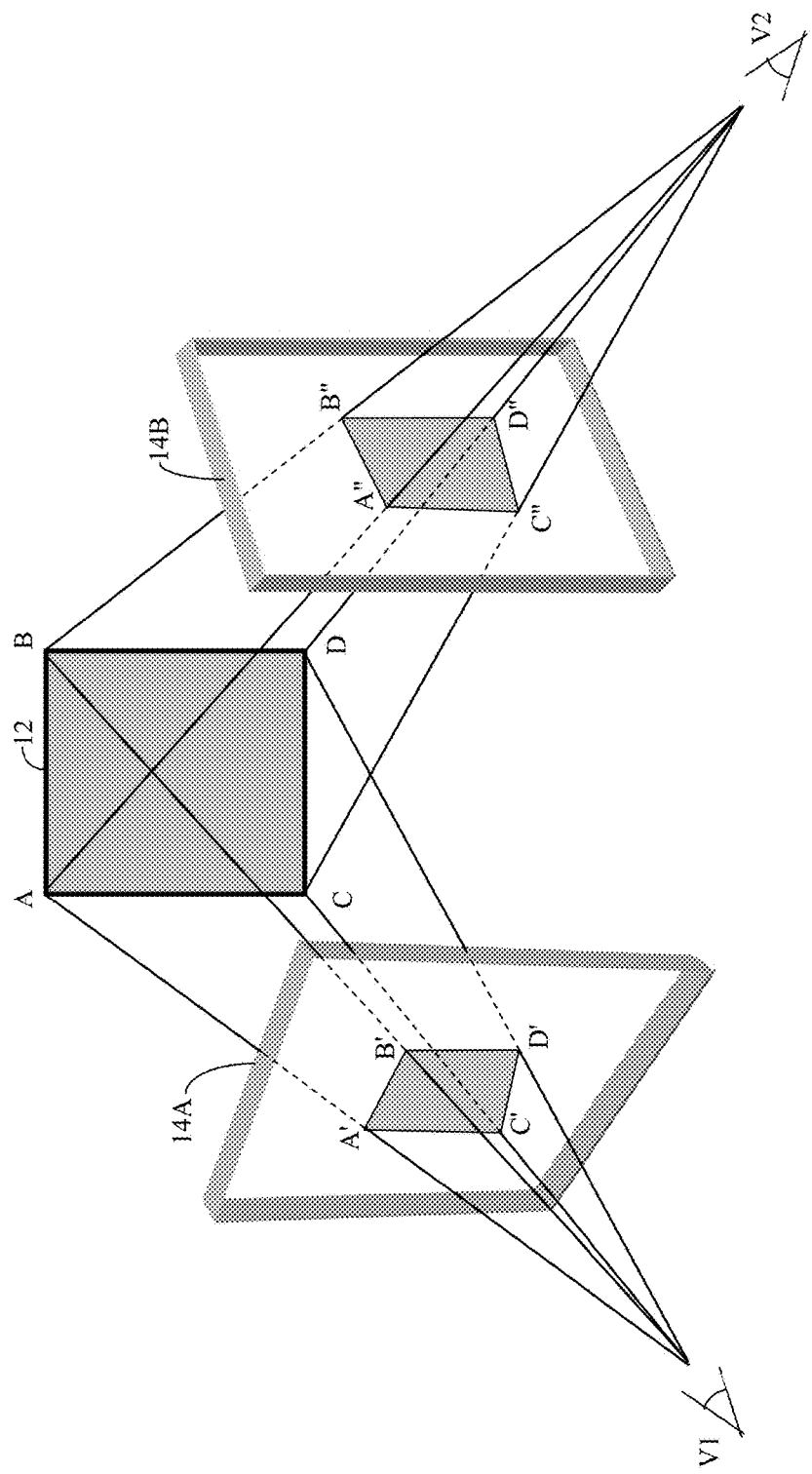
FIG. 5 illustrates the establishment of homography constraints from stereo constraints.

Epipolar geometry also forms the basis for homography, i.e. projective transformation. Homography describes what happens to the perceived positions of observed objects when the point of view of the observer changes. An example of this is illustrated in FIG. 5, where the shape of a square 12 is shown distorted in two image projections 14A and 14B as viewed from two different points of view V1 and V2, respectively. Like before, image planes 14A and 14B may be thought of as windows through which the square 12 is viewed.

Homography would identify the points in common between image projections 14A and 14B and square 12 (i.e. point registration). For example, the four corners A, B, C and D of square 12 correspond respectively to points A', B', C' and D' in image projection 14A, and correspond respectively to points A", B", C" and D" in image projection 14B. Thus, points A', B', C' and D' in image projection 14A correspond respectively to points A", B", C" and D" in image projection 14B.

Assuming that the pinhole model applies, epipolar geometry permits homography to relate any two images of the same planar surface in space, which permits image rectification, image registration, or computation of camera motion (rotation and translation) between two images. Once camera rotation and translation have been extracted from an estimated homography matrix, this information may be used for navigation, or to insert models of 3D objects into an image or video, so that they are rendered with the correct perspective and appear to have been part of the original scene.

Figure 6:
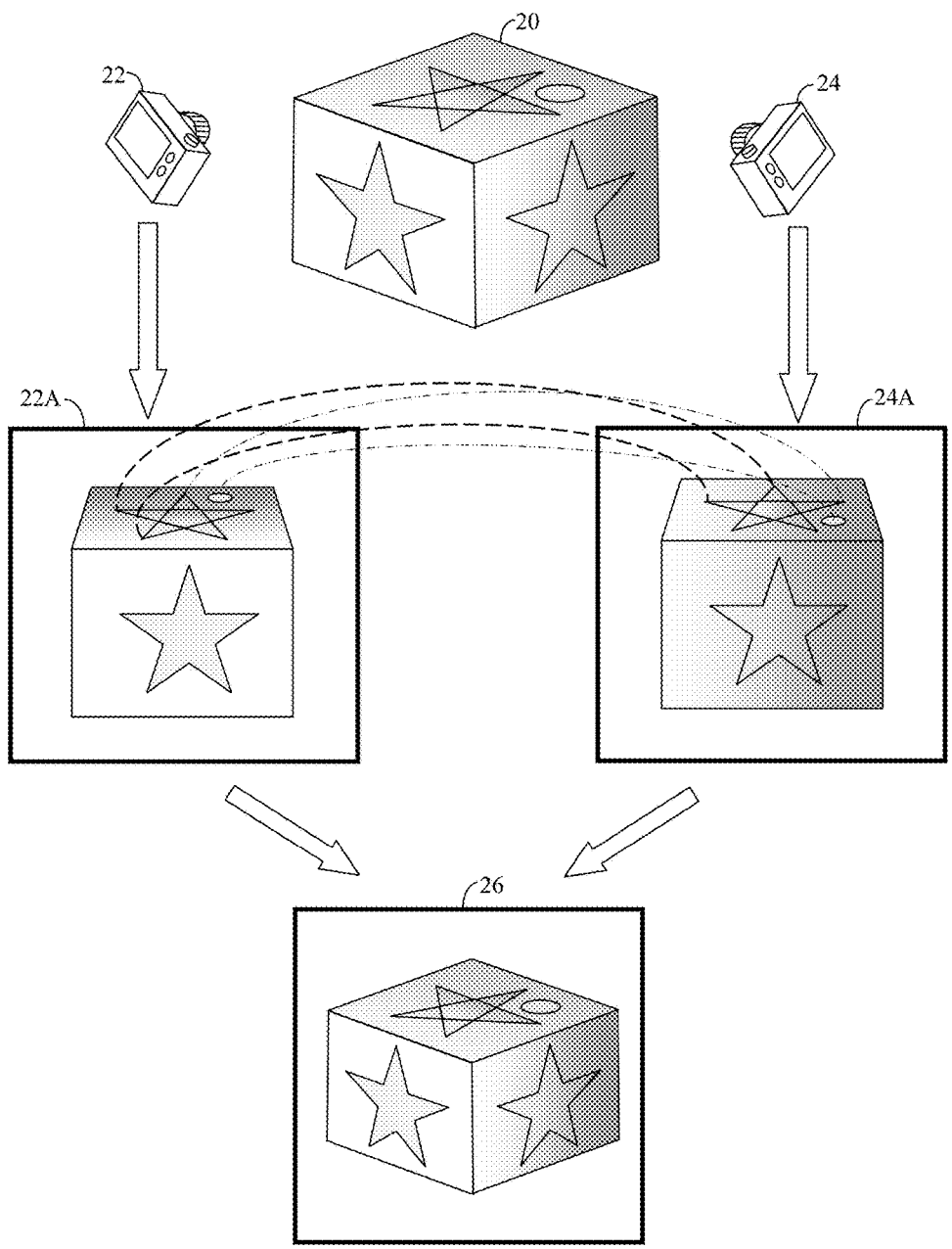
FIG. 6 illustrates homography to re-establish a perspective (i.e. 3D) view from a stereo pair of images, which are images of a common scene but each image has a different field-of-view, i.e. FOV.

For example in FIG. 6, cameras 22 and 24 each take a picture of a real-world scene including a cube 20 from different points of view. From the view point of camera 22, cube 20 looks as shown in 2D image 22A, and from the view point of camera 24, cube 20 looks as shown in 2D image 24A. Homography permits one to identify correlating points, some of which are shown by dotted lines for illustration purposes. This permits both 2D images 22A and 24A to be stitched together to create a 3D image, as shown in image 26. Thus, automatically finding correspondence between pairs of images is the classic problem of stereo vision. Integral to this, however, is the identifying of feature points in the pairs of images, and the matching of corresponding feature points in the pairs of images.

The above discussion of stereo vision, such as epipolar geometry and homography, may be collectively referred to as perspective constraints, particularly as applied to a stereo image pair.

Because of their use in establishing perspective (i.e. 3D) information, feature based correspondence matching algorithms have found wide application in computer vision. Examples of feature based correspondence matching algorithms are the "speeded up robust features" (SURF), "gradient location and orientation histogram" (GLOH), histogram of oriented gradients (HOG), Harris affine region detector, scale-invariant feature transform, SIFT, and the affine SIFT (or ASIFT). For the sake of illustration, the SIFT transformed is herein described briefly. It is noted, however, that feature based correspondence matching algorithms such as SIFT and Affine SIFT, purposely exclude edge points from their analysis and thus are not well suited for edge detection.

As it is known in the art, the SIFT algorithm scans an image and identifies points of interest, or feature points, which may be individual pixels, and describes them sufficiently (typically relative to their neighboring pixels within a surrounding pixel window of predefined size) so that the same feature point (or pixel) may be individually identified in another image. A discussion of the SIFT transform is provided in U.S. Pat. No. 6,711,293 to Lowe, which is herein incorporated in its entirety by reference. Essentially, SIFT uses a library of training images to identify feature points that are characteristic of a specific object. Once a library of the object's characteristic feature points (e.g. pixels) have been identified, the feature points can be used to determine if an instance of the object is found in a newly received test image. Another example of feature point extraction is the Oriented FAST and Rotated BRIEF (ORB) technique, as describe in "ORB: an efficient alternative to SIFT or SURF" by Rublee et al. *International Conference on Computer Vision,* 2011.

Irrespective of the type of feature point extraction technique used, feature points (i.e. points of interest) are extracted to identify pixels in multiple different images that correspond to the same real-world point in a scene. They may also be used to identify a specific object by extracting feature points of the object in a set of training images to generate a "feature description" of the specific object. This feature description can then be used to identify the specific object in a test image containing many object-types. To perform reliable recognition, it is preferred that the features extracted from the training images be detectable under changes in image scale, noise, illumination, and rotation. Feature points usually lie near high-contrast regions of an image. However, since distortion of an object (such as if a feature points is located in an articulated or flexible parts of the object) may alter a feature point's description relative to its neighboring pixels, changes to an object's internal geometry may introduce errors. To compensate for these errors, SIFT typically detects and uses a large number of feature points so that the effects of errors contributed by these local variations may be reduced.

In a typical SIFT application, feature points of objects are first extracted from a set of training images and stored in a database. An object is recognized in a new image (i.e. a test image) by individually comparing each feature point extracted from the new image with the feature points in this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object is computed, given the accuracy of fit and number of probable false matches. Object matches that pass all these tests can be identified as correct.

Figure 7:
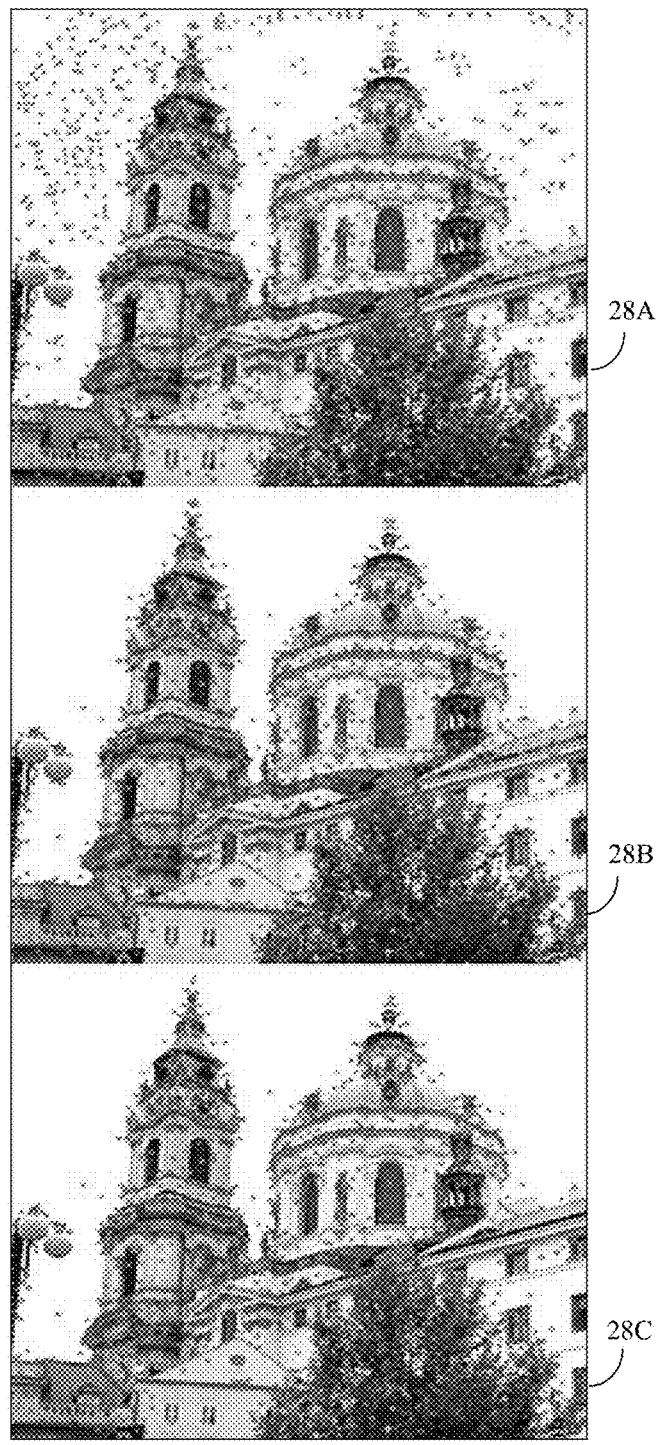
FIG. 7 illustrates feature point extraction from a sample image.

An example of a SIFT determination of feature points in an image is illustrated in FIG. 7. Possible feature points are first identified, as indicated by dark dots in image 28A. Possible feature points that have a low contrast are then discarded, as illustrate in image 28B. Finally, possible features points located on edges are removed, which leaves the final set of feature points shown in image 28C.

Figure 8:
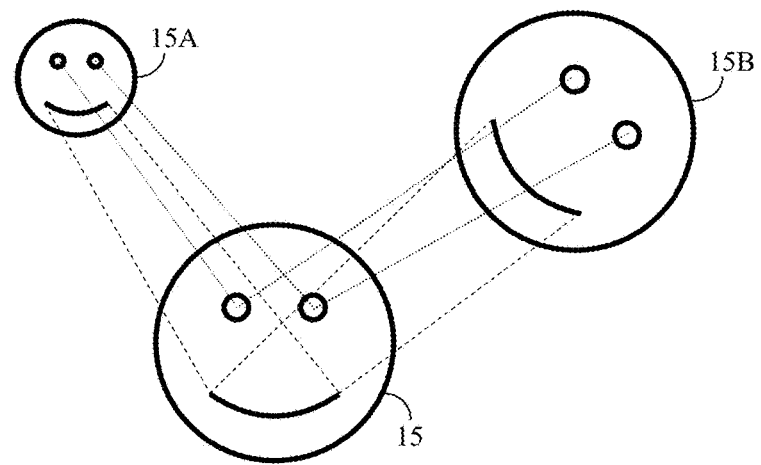
FIG. 8 illustrates the establishment of feature point correspondence using an SIFT transform.

Thus, SIFT permits one to match feature points of an identified object from one image to another. This is illustrated in FIG. 8, where three images of the same object, i.e. a happy face, are shown. For illustration purposes, only four feature points, corresponding to points near the eyes and the corners of the mouth, are shown. As indicated in FIG. 8, SIFT can match feature points from a first face 15 to a scaled down version 15A of the same face. SIFT can also match feature points from first face 15 to a rotated version 15B of the same face. However, SIFT has been found to have limited immunity to affine transforms of images. That is, SIFT is limited to the amount of change in the view-angle an imaged object can undergo and still be identified.

A method of extending a SIFT transform to better handle affine transformations is described in "ASIFT: A New Framework for Fully Affine Invariant Image Comparison" by Morel et al, SIAM Journal on Imaging Sciences, vol. 2, issue 2, 2009, which is herein incorporated in its entirety by reference.

Figure 9:
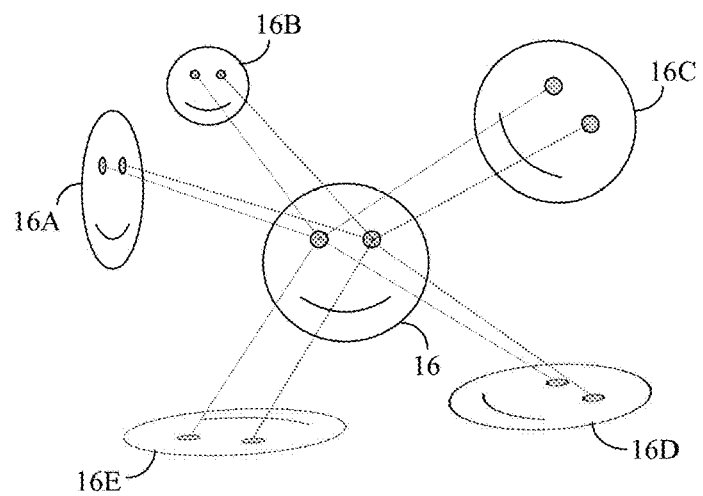
FIG. 9 illustrates the establishment of feature point correspondence using an ASIFT transform.

With reference to FIG. 9, an Affine SIFT would be better able to match feature points from second face 16, to representations of the same object that have undergone affine transformations, as illustrated by happy faces 16A, 16B, 16C, 16D, and 16E.

Figure 10:
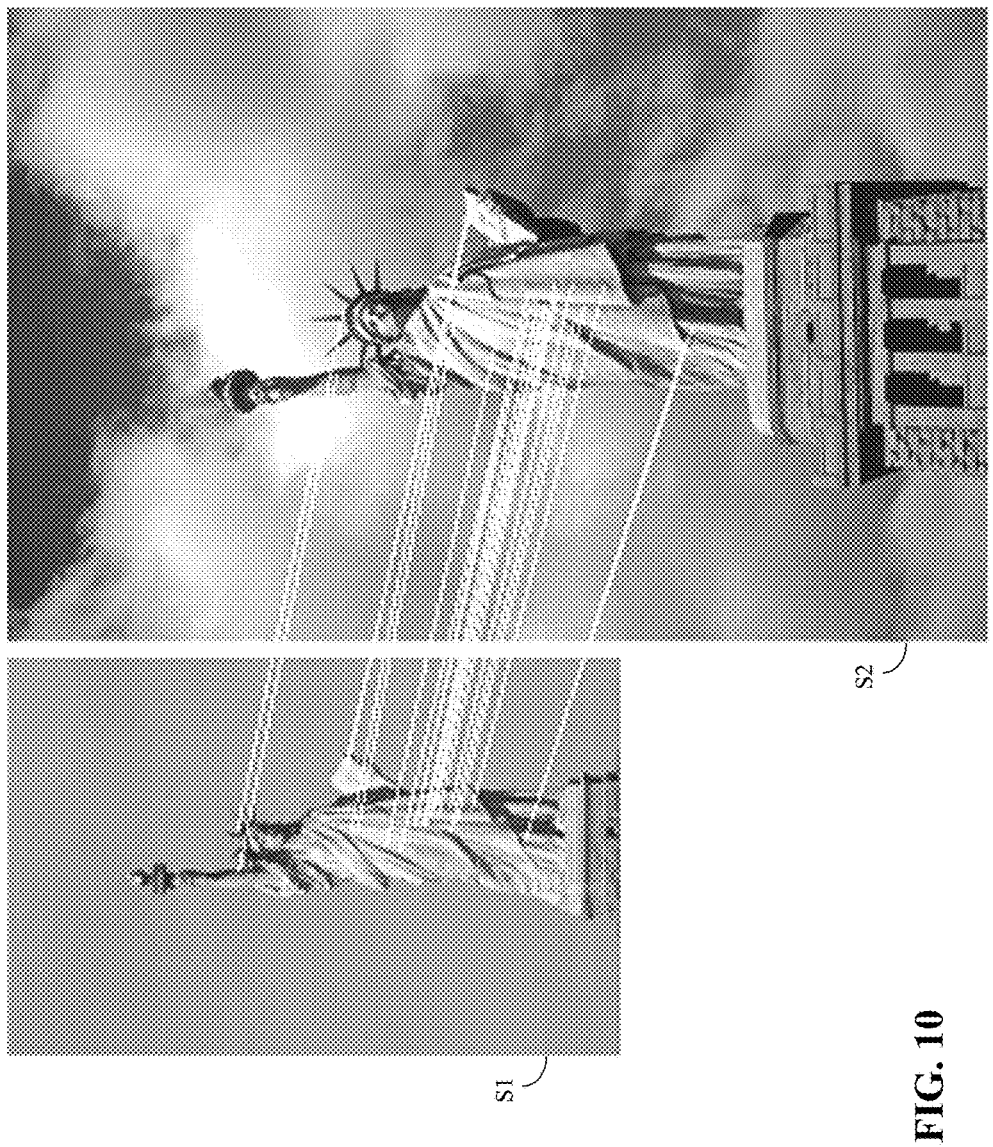
FIG. 10 is an example of feature point correspondence in two images of a common scene, taken from different field-of-views, i.e. FOVs.

An example of an application of an Affine SIFT transform is illustrated in FIG. 10, where multiple feature points are matched from a first sample image S1 of the Stature of Liberty from a first view angle, to a second sample image S2 of the Statue of Liberty from a different view angle and at a different scale.

Figure 11:
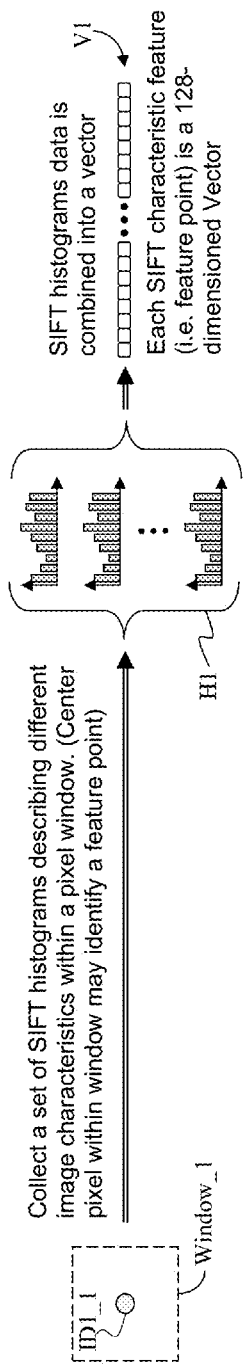
FIG. 11 provides an overview of the feature point extraction function of SIFT.
Figure 12:
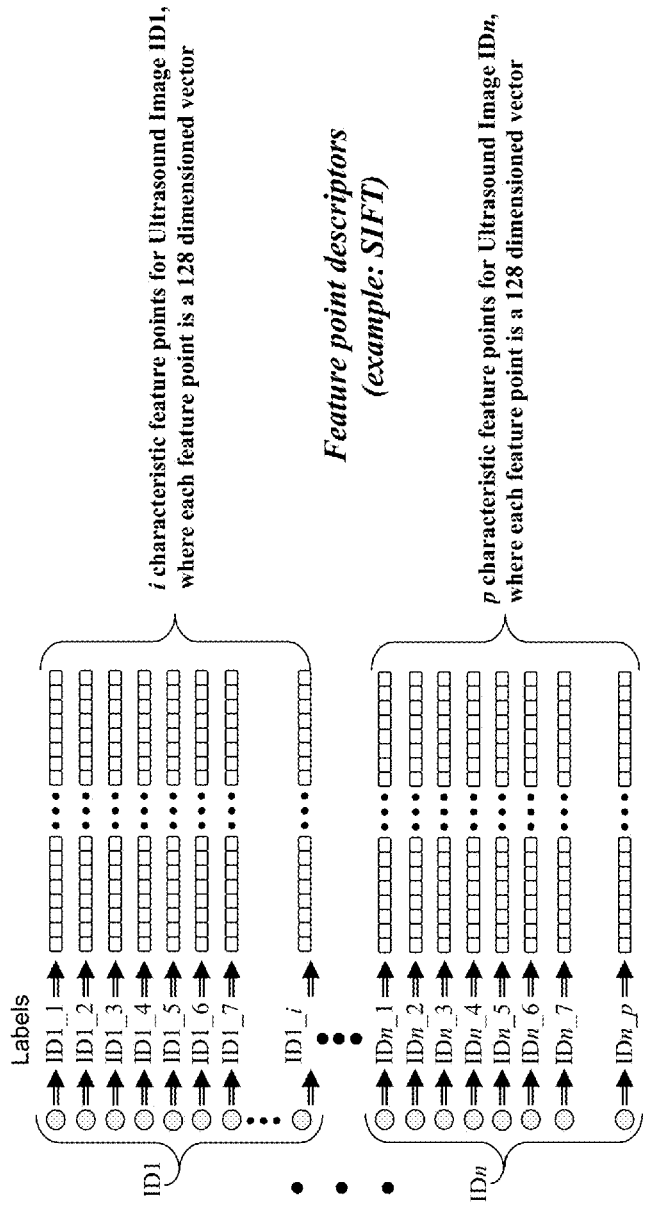
FIG. 12 illustrates multiple sets of feature points extracted from n images, where the images are identified as ID1 through IDn.

A quick overview of the feature point extraction function of a SIFT filter/algorithm/module/processor is illustrated in FIGS. 11 and 12. With reference to FIG. 11, each extracted feature point ID_1 (such as those illustrated in FIG. 6-9) is described by a series of metrics falling into several categories, i.e. distinguishing characteristics, within a window, e.g. an array of pixels represented as Window_1. The center point (or center pixel) within a window may be identified as the feature point for that window. If desired, each feature point is assigned an identification code, ID, for quick reference. For example feature point ID1_1 may identify the feature point as being feature point number "1" extracted from image "ID1".

The observed metrics are arranged into corresponding histograms, and thus multiple histograms are created for each feature window. Consequently, a typical SIFT processing algorithm creates a series, or a set, of SIFT histograms H1, and each set of histograms collectively describes an individual feature point (or SIFT descriptor). Each of the SIFT histograms statistically describes a distinguishing characteristic of the feature point relative to its neighborhood of pixels (or pixel window) surrounding the feature point (or item descriptor) in the image being processed.

The series of SIFT histograms H1 are then collected (or otherwise combined) into single vector V1, which defines one feature point. That is, each vector V1 provides sufficient data to identifying an individual pixel (or feature point) within an image. Therefore, each vector V1 describes a single item descriptor (i.e. a feature point or characteristic feature or (feature) pixel) and typically consists of 128 pieces of descriptive data. Thus, each feature point is characterized (i.e., described or identified) by a 128-dimensioned vector V1.

FIG. 12 illustrates multiple sets of feature points extracted from n images, where the images are identified as ID1 through IDn. Each image is shown to have a set of feature points (illustrated as circles) individually identified. For example, i feature points are extracted from image ID1, and they are labeled ID1_1 through ID1_i. Similarly, p feature points are extracted from image IDn, and they are labeled IDn_1 through IDn_p. Each feature point is a 128-dimension vector (i.e. a vector with 128 data cells). The extracted feature points from one image may then be matched to (i.e. compared to find a match with) extracted feature points from other images.

The Holocam Orb System

Returning now to the Holocam Orb System, the following section describes a preferred Holocam Orb system, or project, implementation used for gathering time-aligned, real time sensor data from multiple viewpoints of a live, three dimensional scene.

It is beneficial for some applications that data gathered from a particular viewpoint be tightly correlated in the time domain in real time. To achieve this, a unique bundling of various electronic sensor types into a discrete unit, herein termed a Holocam Orb, is proposed. Preferably, a single high performance custom logic module (e.g. circuit module, or board) within each Orb processes the data from all its sensors and provides an accurate time stamp with the data. The benefit of this configuration is that the various types of sensor data from a particular viewpoint can be tightly correlated in both 3D space and in the time domain.

Details of an Exemplary Holocam Orb

Figure 13:
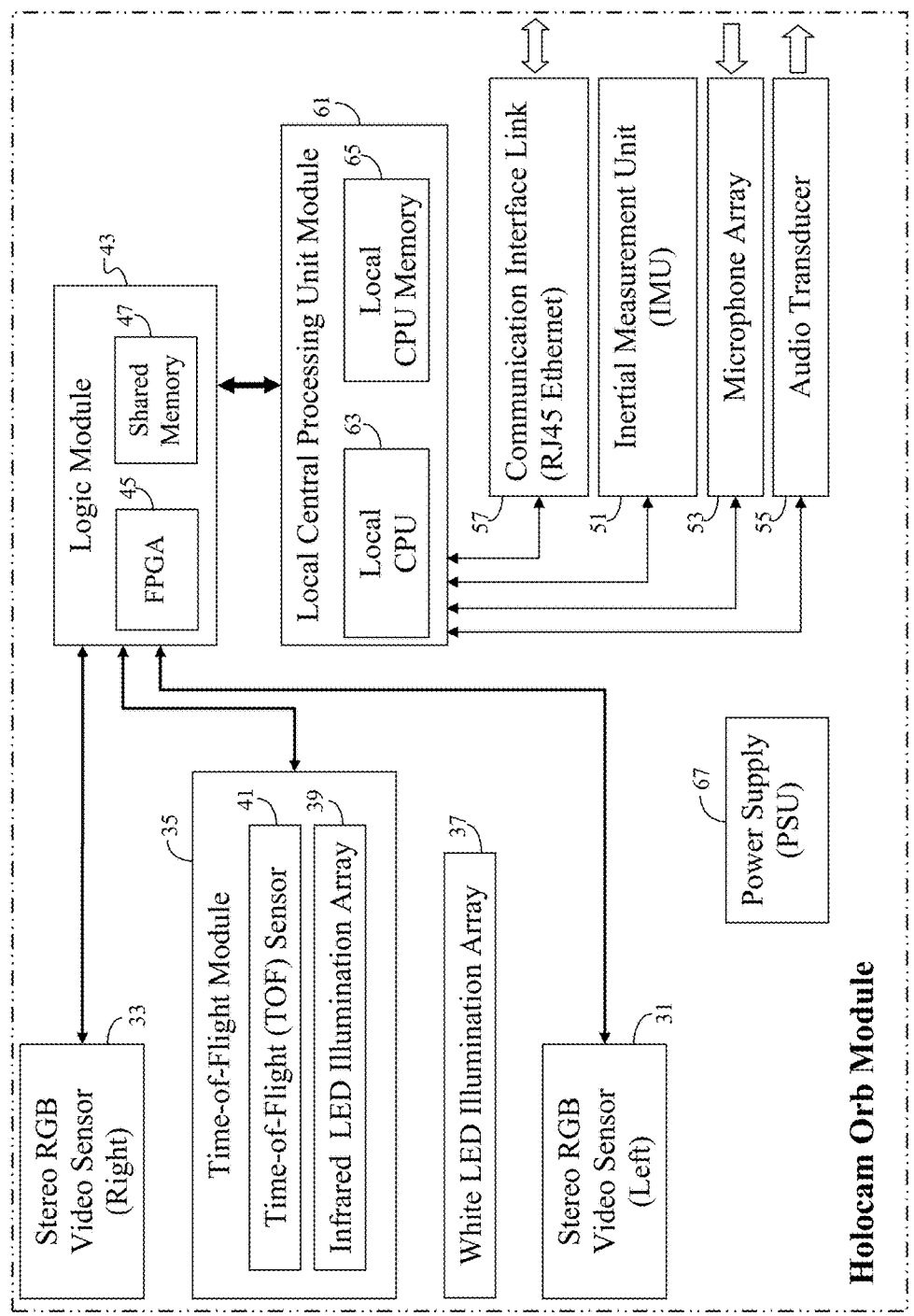
FIG. 13 is a simplified block diagram of internal components of an exemplary Holocam Orb (or Holocam Orb Module) of FIG. 1.

With reference to FIG. 13, a Holocam Orb (or Holocam Orb Module) is a collection of a number of data sensors packaged together in an integral unit. For example, a preferred Holocam Orb includes a stereo image sensor, such as a stereo still-image (capture) sensor or a stereo video (capture) sensor. The presently preferred embodiment uses a stereo video sensor comprised of a pair of video sensors 31 and 33. That is, video sensor 31 is a left video sensor (e.g. a two-dimensional (2D) video camera) and video sensor 33 is a right video sensor (e.g. 2D video camera), and they are preferably spaced apart a distance representative of a typical distance between left and right eyes of an adult person so as to provide images that represent what would be viewed by the person's left and right eyes. This permits the Holocam Orb to reproduced stereo vision. Preferably, a white LED (light emitting diode) illumination array 37 is integrated within the Holocam Orb to provide illumination for the left and right video sensors 31 and 33. As shown, each video sensor 33 and 35 is preferably an RGB (i.e. color) video sensor.

Preferably positioned between left and right video sensors 31 and 33, is a time-of-flight module 35, which includes at least one (and preferably 4) time-of-flight (TOF) sensor(s) 41 and an infrared LED illumination array 39. As it is known in the art, a TOF sensor 41 is a range sensing, or imaging, device (e.g. camera system or laser system) that resolves distances from the TOF sensor 41 to points (i.e. subjects) in a scene by using the known speed of light and the measured time-of-flight of IR signals from infrared LED illumination array 39 to points in the scene and back to TOF sensor 41. Preferably, the Holocam Orb identifies and associates the time-of-flight points provided by TOF sensor 41 with corresponding image pixels provided by left and right video sensors 31 and 33. All sensors are in communication with a Logic Module 43.

Logic Module 43 may provide custom logic to process the data from all sensors, e.g. time-of-flight module 35 and left and right video sensors 31 and 33, and may further provide a time stamp for the gathered data. Preferably, Logic Module 43 is comprised of a field programmable gate array (FPGA) 45 and FPGA Shared Memory 47. It is to be understood that FPGA Shared Memory 47 may be internal to FPGA 45, or may be a discrete memory module. Further preferably, data gathered by left video sensor 31, right video sensor 33, and TOF sensor 41 are stored within FPGA Shared Memory 47. It is also to be understood that other custom logic circuitry, such as an application specific integrated circuit (ASIC), may be used in place of FPGA 45. Further alternatively, the functions of FPGA 45 may be implemented in a central processing unit (CPU) or other data processing device.

The Holocam Orb further includes an inertial measurement unit (IMU) 51. Generally, an inertial measurement unit (IMU) is an electronic device that measures velocity, orientation, and gravitational forces using a combination of accelerometers and gyroscopes, and sometimes also magnetometers.

A microphone array 53 is provided to record sound from the scene being observed. Preferably, the microphones of microphone array 53 are positioned to pickup surround sound from the scene. Also preferably provided is an output audio (sound) transducer 55 to provide an audio (e.g. audible or sound) output for the Holocam Orb.

Communication interface (or communication interface link) 57 provides a communication link between the Holocam Orb and a central computing system (such as computer system 2 of FIG. 1) or other Holocam Orbs. Communication interface 57 may support a standard RJ45 Ethernet connection, and preferably supports standard (Ethernet) network card functions. Although wireless communication may be used, the presently preferred embodiment uses wired communication, and preferably uses standard Ethernet network (e.g. computer network) communications, such as Gigabit Ethernet.

All of the above components are linked (directly or indirectly) to a local central processing unit module 61, which includes a local central processing unit (Local CPU) 63 and Local CPU memory 65.

The Holocam Orb further includes a power supply unit (PSU) 67, whose power is preferably distributed to all components of the Holocam Orb. It is to be understood that various power conversions may be provided in the distribution of power from PSU 67 to the components of the Holocam Orb. For example, PSU 67 is preferably a switching power supply and sequence controller, and it may be used to produce a linear power supply within each of left video sensor 31 (linear power supply 48A in FIG. 14), right video sensor 33 (linear power supply 48B in FIG. 14), and time-of-flight module 35 (linear power supply 48C in FIG. 14).

Figure 14:
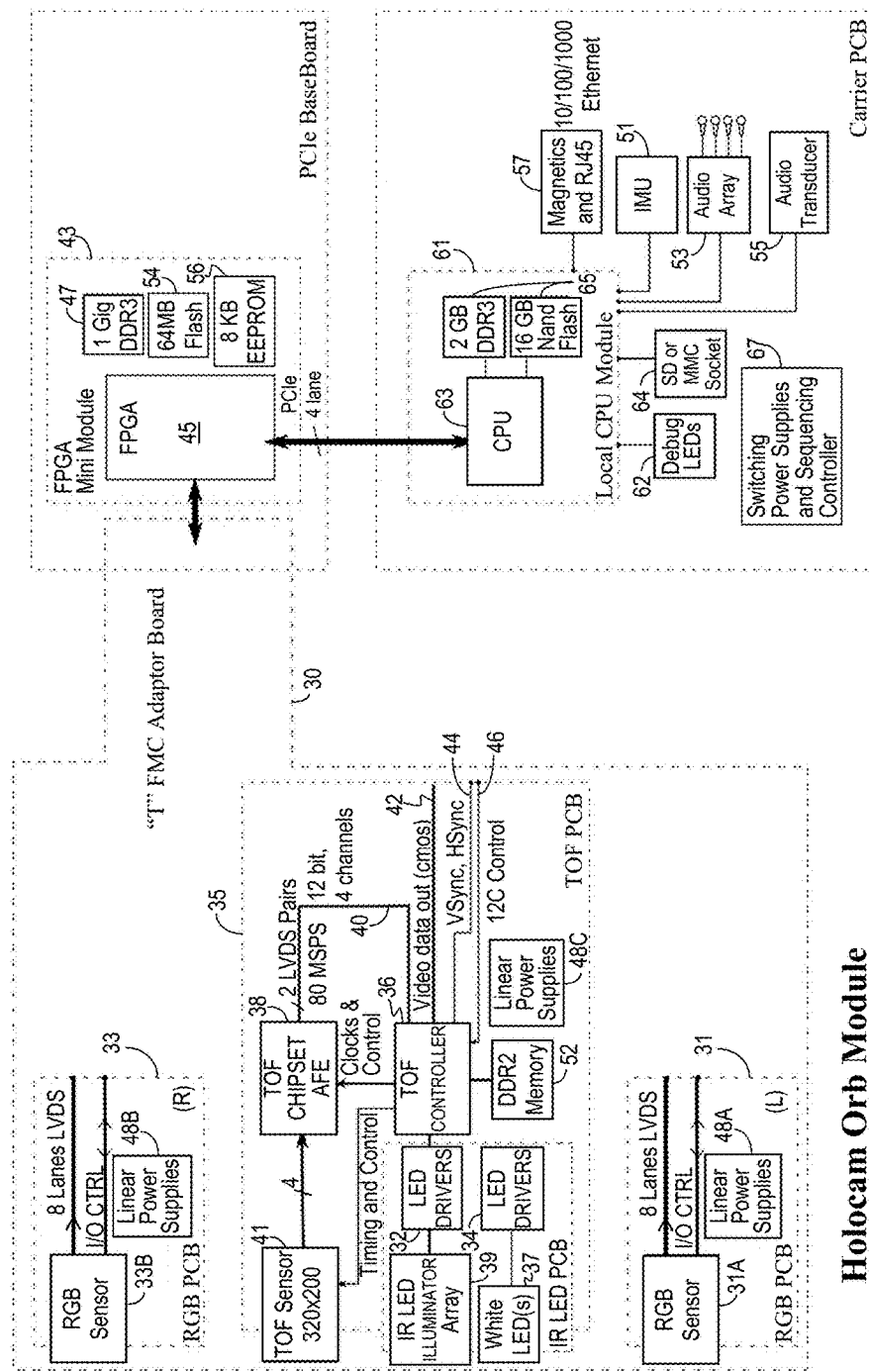
FIG. 14 is a more detailed circuit board-level description of the internal construct of the exemplary Holocam Orb Module of FIG. 13.

FIG. 14 provides a more detailed, circuit board-level view of the block diagram of FIG. 13. All elements similar to those in FIG. 13 have similar reference characters and are described above.

As is explained above, a Holocam Orb (or Holocam Orb Module) may include some, or all, and is not limited to the following types of data sensors: left and right stereo video sensors 31 and 33, time-of-flight (TOF) module 35 (including TOF sensor 41 and IR LED array 39), inertial measurement unit (IMU) 51, microphone (or audio) array 53, and audio transducer 55.

Logic module 43 is preferably implemented as a Xilinx® Zynq FPGA Mini Module Plus board on a PCIe BaseBoard, such as the Xilinx® MMB PCIe BaseBoard. In an exemplary embodiment, FGPA 45 may be implanted as a Zynq Xilinx® FPGA. In the present example, FPGA Shared Memory 47 is preferably fast volatile memory, and preferably implemented as double data rate, type three, (DDR3) synchronous dynamic random-access memory (SDRAM). FPGA module 43 may have additional (preferably nonvolatile) memory, such as flash memory 54 and/or Electrically Erasable Programmable Read-Only Memory (EEPROM) memory 56.

Local central processing unit module 61 may be implemented using a T30 Tegra® 3 Module provided by NVIDIA® Corp. In this case, Local CPU 63 may be an A9 ARM Tegra® 3 SOC (system-on-Chip). Local CPU 63 may communicate with FPGA 45 using a 4-lane PCIe bus.

In the present example, Local CPU 63 and Local CPU memory 65) reside on a carrier PCB (printed circuit board), such as the EPSON® P2.5 Carrier PCB. Also on the carrier PCB are communication interface link 57 (which may include magnetics and RJ45), PSU 67, IMU 51, audio array 53, and audio transducer 55.

The system is designed such that other sensor types (or components) can be added to the Holocam Orb. It is be understood that the present invention is not limited to the simplified architecture of FIG. 13, and other components or sensors may be added without deviating from the present invention.

For example in FIG. 14, local central processing unit module 61 may additionally have one or more debug light emitting diodes (LEDs) 62 to visually convey information, such as error codes, to a human user. Memory capacity may also be augmented by the use of an optional memory socket 64 to receive additional memory modules/cards/chips, such as a secure digital (SD) memory card or a Multi-Media Card (MMC), or other (preferably nonvolatile) memory.

In the present example, the remaining sensors reside on an FPGA Mezzanine Card (i.e. FMC Adapter Board 30). As it is known in the art, an FMC Adapter Board is an ANSI standard that provides a standard mezzanine card form factor, connectors, and modular interface to an FPGA located on a base board. The presently preferred embodiment uses a BASE T FMC Adapter, such as the EPSON® "T" FMC Adapter Board. As it is known in the art, the "BASE" designation denotes that baseband transmission is used, and the "T" designates twisted pair cable, where the pair of wires for each signal is twisted together to reduce radio frequency interference and crosstalk between pairs.

It is further to be understood that additional support circuitry may be added without deviating from the present invention. For Example within TOF module 35, LED drivers 32 and 34 may be added to help drive infrared LED illumination array 39 and white LED illumination array 37, respectfully. Similarly, a TOF controller 36, such as the TI OPT9220 from Texas Instruments®, may be used to control components within TOF module 35, including an Analog Front-End (AFE) TOF Chipset 38 used to read sensor results from TOF sensor(s) 41. AFE module 38 (i.e. TOF Chipset AFE 38) may be implemented, for example, as Texas Instruments® commercial AFE product VSP5324. Preferably, AFE module 38 has four inputs to read four time-of-flight outputs from TOF sensor 41 (i.e. TOF sensor 41 may be comprised of multiple (preferably 4) individual TOF sensors each providing a separate input to AFE module 38). For each TOF sensor input, AFE module 38 may provide a sample-and-hold circuit that rejects common-mode noise among the inputs, a high speed 12-bit analog-to-digital converter (ADC) digitizes each input, and delivers the acquired time-of-flight data serially over low voltage differential signaling (LVDS) channels 40 to TOF controller 36. Controller 36 may then output video data 42, VSync and HSync signals 44, and other control signals 46 to Logic Module (i.e. FPGA module) 43. Optionally, TOF controller 36 may be provided with additional RAM memory 52, preferably implemented as DDR2 memory.

Left RGB sensor (e.g. color video sensor) 31A is shown within left video sensor block/module/circuit 31 and a right RGB sensor (e.g. color video sensor) 33B is shown within right video sensor block 33. For the sake of simplicity, the terms "RGB sensor" and "video sensor" may be used interchangeably hereinafter. RGB sensors 31A and 33A may each be implemented using commercial product OV16820 from OmniVision®.

Data from the sensors on FMC Adapter Board 30 flow into Logic Module 43, where it is processed by FPGA 45 and stored in the FPGA Shared Memory 47. Preferably, the FPGA 45 is a Xilinx® Zynq FPGA Mini Module Plus unit. The FPGA 45 timestamps the gathered data, and then informs the Local CPU 63 that a bundle of sensor data is ready for collection. The Local CPU 63 fetches the data from FPGA Shared Memory 47, further processes and packages it, and forwards the sensor data to other Holocam Orbs and/or to an external base station, such as computer system 2 of FIG. 1.

The Logic Module 43 offers a programmable logic core that can be adapted to various sensor types, and it connects to each sensor interface(s). FPGA 45 further implements a command and control path interface from the Local CPU 63 to each sensor. Additionally, FPGA 45 implements a data capture path to gather sensor data and temporarily store it in FPGA Shared Memory 47, and further implements a real time clock and timestamps each sensor data stream. FPGA 45 also implements a data path from the FPGA Shared Memory 47 to the Local CPU memory 65.

The Local CPU 63 receives command and control data from other Holocam Orbs and/or a base station (such as computer system 2 of FIG. 1). Local CPU 63 also issues command and control commands to the local sensors via Logic Module interface 43. Local CPU 63 also fetches sensor data from the FPGA Shared Memory 47, processes and packages the sensor data in its Local CPU Memory 65, and forwards the packaged sensor data to the central base station 2.

Each of RGB Video Sensors (RGB) 31/33 gathers visible light images multiple times per second.

Time-of-flight Sensor (TOF) 33 gathers a two dimensional array of distance data from objects in its field-of-view to the Holocam Orb.

Inertial Measurement Unit (IMU) 51 provides multiple dimensions of accelerometers, several times per second.

Microphone Array 53 provides multiple parallel streams of digital audio samples from acoustic sensors mounted in the Holocam Orb.

FPGA Shared Memory 47 provides multiple buffers of storage for each attached sensor (i.e. 31, 33 and 41). FPGA Shared Memory 47 is used to store and forward operations of the sensor data for the Local CPU 63 to access.

Local CPU Memory 65 provides multiple buffers of storage for the local sensor data which has been gathered from the FPGA Shared Memory 47, and offers access to remote devices who request it.

Power Supply Unit (PSU) 67 provides required power sources for the multiple electronics components present in the Holocam Orb.

Inter-Orb Synchronization

The present section discusses a method for synchronizing multiple Holocam Orbs to a master clock. Thus, this section describes the unique methods used to synchronize multiple real time data gathering modules, i.e. Holocam Orbs, to a master clock, so that all the gathered data (such as from the internal sensors of each individual Holocam Orb) can be correlated in the time domain.

Certain applications require that all data gathered from all Holocam Orbs in a scene be synchronized to a master clock, so that data can be time stamped and time aligned in real time by processing nodes in the system, including an optional base station, such as computer system 2 of FIG. 1, for example. As well, it is preferred that all sensor data streams be capable of starting at the exact same time. This section describes a novel methodology used to synchronize the timestamp clocks and sensor streams of each Holocam Orb with an improved low latency and low jitter result.

The presently preferred system uses a linked system of timing logic that allows all sensors (of multiple Holocam Orbs) in a Holocam Orb system installation to be synchronized together to a high level of precision, as an extension to techniques found in the IEEE 1588 Precision Time Protocol Ethernet standard, herein incorporated in its entirety by reference. The present method allows sensor data gathering from all Orbs in a Holocam Orb system installation to all start up at the exact same clock time, to the level of precision offered by the subcomponents contained in the Holocam Orb synchronization electronics. While subset components of this system may be similar to other existing systems, the presently preferred, specific implementation offers an improved method of synchronizing sensor data across multiple sensors and multiple Orbs in an installation.

The following is a detailed discussion of the preferred timing logic system used in the present Holocam Orb system. Sub-components described in this discussion are implemented in each Holocam Orb to achieve the desired low latency and low jitter results.

A distributed clocking system in accord with the present invention is implemented using the following (timing logic) subcomponents in each Holocam Orb. Each Orb preferably includes a high quality crystal oscillator used as a (local) clock reference (i.e. local Reference Oscillator) for its local Logic Module 43. Also included is a local custom Timestamp Clock implemented in the Logic Module 43, and derived from the clock reference, or local Reference Oscillator, mentioned above. A local synchronization pulse (e.g. local VSync) is derived from the same clock reference, and is controlled by a frame rate value register.

The Local CPU Module 61 in a respective Orb implements an IEEE 1588 PTP Local Reference Time Counter at the local Ethernet communications interface. 1588 Precision Time Protocol (PTP) messages are used to tightly align all the Orb timestamp clocks together to a designated 1588 Master Clock, which may be the computer system 2 of FIG. 1, any of the Orbs in the Holocam Orb system installation, or other dedicated timing source in the installation. Custom software then updates the timing of the Logic Module 43 to match the Local CPU clock time, every time a new clock update arrives from the 1588 Master Clock.

The Local Timestamp Counter in the Logic Module 43 is then used as a reliable time clock source to timestamp the local sensor data streams received by the Logic Module 43. The Local Timestamp Counter can optionally be used to align all the VSync pulses in the network to the same clock time, and thus be closely aligned with each other.

The end result of this timing logic system is that the custom time clock of each Orb is now very closely aligned to the reference 1588 Master Clock, allowing for a very close alignment of the sensor data timestamps between Orbs, and allowing a present method to align together the VSync signals of each video sensor in each Orb using its local clock time, rather than a traditional external sync source.

The present section discusses a method of synchronizing the local VSync signal of each Orb. The local VSync signal is preferably used to synchronize the one or more of the local sensors within each Orb. A frame rate value register is set by an Orb's Local CPU 63 to the desired frame rate for the Holocam Orb. Any local frame based streaming sensors are also set to the same frame rate and configured to accept the local VSync signal as a timing reference. All configured sensors will then align to the local VSync signal.

The local VSync signal can also be set to align to a desired local timestamp clock value on demand for specific requirements. To achieve this, a set of hardware registers is implemented in the Logic Module 43 that stores a time counter value that can be written to (i.e. given a programmed time value) by the Local CPU 63. When this stored value matches the value found in the local Timestamp Clock, a reset pulse is generated which aligns the local Master VSync pulse with the programmed time value. Any local sensors that have been set to synchronize to the local VSync pulse will then also realign with the programmed time value.

Multiple Holocam Orbs can be made to participate in system wide synchronization. For all Holocam Orbs participating in system wide synchronization, the VSync Synchronizing Event will reset all the local VSync Pulses of all the Orbs to start at the same clock IEEE 1588 clock time. All the VSync pulses will then be time aligned, asserting simultaneously after the event.

A synchronizing technique for synchronizing the local stream start time of each Orb is also provided. In some applications, it is preferred that the sensor data streams in all the Orbs all start at the same clock time, simplifying the task of aligning these data streams in the application (or system). The following methods are preferably used to implement this feature. A local Start Stream Time register is implemented in the local Logic Module 43 for each participating sensor data stream of an Orb. The Orb's Local CPU 63 sets desired start time(s) for each participating sensor. The Local CPU 63 then enables the feature for each participating sensor. When the local Timestamp Counter reaches the matching value (i.e. set start time(s)), the participating stream(s) are enabled, causing the sensor data to begin flowing. Because the local Timestamp Counter in each participating Holocam Orb is updated to tightly match the IEEE1588 Timing Master clock time, all participating sensor data streams will start at precisely the same time.

The presently preferred system also provides a method of aligning the frame start time of frame-based streaming sensors. Some frame-based streaming sensors cannot be started up instantly on demand, but instead need to be enabled and allowed to stabilize for a finite amount of time, depending on the sensor model, before they can provide valid streaming data. The two methods in the Holocam Orb system described above can be combined to effectively add the ability to gather a frame of sensor data from an arbitrary point in time from a streaming only sensor, using the following novel method.

First, a desired start time for the operation is selected. This desired start time must be far enough in the future from the configuration process such that the streaming sensors will have had time to stabilize. The desired start time value (T) is then programmed into the start time registers of the participating sensors. The desired frame rate period (p) is then set into the local VSync Frame Rate register. The frame rate of all participating sensors is then set to the same frame rate set in the local VSync Frame. A local VSync reset time is now calculated as an integer multiple of frame times (n) back from the stream start time. This should exceed the number of frames (s) that the sensor requires to become stable. This value is then programmed into the local VSync reset register, and the enable flags for the participating logic are then set.

As the local Timestamp clock counts forward the following events happen. First, at time T minus (n times p) the local VSync reset time will match the clock time and cause the local VSync Pulse to realign to the current time. Second, the frame based sensors will start adapting to the new VSync time alignment and settle after (s) frames. Third, at time T the stream enables will start, and since the local VSync pulse is also aligned to an integer multiple of time T, local VSync will trigger at the same time as the stream enables turn on, and thus so will the streaming sensors start a new frame at this same time (T).

Intra-Orb Synchronization

The following section discusses a method for synchronizing real time sensor data streams within an individual Orb. The purpose of this section is to describe the unique synchronization methods used in the Holocam Orb electronics module, such as illustrated in FIGS. 13 and 14.

Multiple Orbs in a Holocam Orb system gather real time sensor data from the same scene, as is illustrate in FIG. 1, for example. Each sensor requires a unique synchronization method, and may require a time stamp to maintain data correlation throughout the entire Holocam Orb system scene.

The sensors in an Orb may be classified into two types: Synchronous sensors and Non-Synchronous (or Asynchronous) sensors. Synchronous sensor types accept external sync signals and align their data transfers to the external sync signals. Asynchronous sensor types do not offer an external sync feature and send out a continuous stream of sensor data.

To simplify the processing of these two disparate sensor types (i.e. different data types), all asynchronous streaming sensor data is packaged into a digital frame bundles analogous to video frames, using the local master sync (e.g. VSync) pulse as a reference point to divide the continuous data stream(s) from the asynchronous sensor(s) into discrete frame bundles. Each frame bundle is then tagged with a timestamp value that updates once per frame (e.g. per video frame).

The following is discussion of methods used in the preferred Holocam System for intra-Orb synchronization. A distributed clocking system is preferably implemented using the following methods. First, each individual Orb implements a Local Timestamp Counter in its own Logic Module 43, as discussed above. In one operation mode, a local master Frame Sync pulse is generated and used to both synchronize the frame based sensors and to divide the continuously streaming sensor data into frame bundles. In a second mode of operation, one sensor is nominated as a Master Sync source (or Master Sync sensor) and it provides a Master Sync Pulse, or signal. The other sensor(s) are configured to synchronize themselves to the Master Sync Pulse from the assigned Master Sync sensor.

To achieve this, local memory is divided up into one or more assigned memory buffers per active sensor. The Logic Module 43 accepts data from each local sensor's data port, and stores it into the assigned memory buffer(s). The selected Master Sync Pulse (either the local VSync pulse or one selected from a given sensor) is used to latch one or more stable copies of the current Timestamp Count value, one copy for each buffer for each active sensor. Each frame bundle may be time stamped with the local slave time clock, or optionally the Local CPU 63 can copy the Timestamp value directly, typically as part of the same operation of copying the matching sensor data. Frame bundles and timestamp values from all the local sensor streams are then ready, and made available to the Holocam Orb installation for processing and/or recording, via the outbound data port 57. Optionally, a higher level bundling of individual sensor bundles may be created by local processing, and made available to the Orb Installation as a unit, with a common timestamp.

Examples of synchronous sensor types include streaming video devices, such as RGB video sensors 31 and 33 and TOF sensor 41, described above. Synchronous sensors have an internal clocking system that can be slaved to an external clock source (e.g. VSync). These sensors generate discrete bundles of data that represent a single "frame" of image data. Each synchronous sensor outputs video data in 2 dimensional image frames, several times per second, and each sensor is synchronized to the local master clock. Preferably, the frame start times of all streaming video sensors used in the scene are aligned to the same instant in time.

Examples of asynchronous sensors types include Inertial Measurement Unit (IMU) 51, Microphone Array 53, as well as temperature sensors, magnetic field strength sensors, and magnetic field alignment sensors, all of which may be optionally incorporated into an Orb in accord with the present invention. Asynchronous sensors generate a continuous stream of live data from the environment, and do not accept external signals to align their data flow to an external clock source. In order to align this type of continuous data stream from asynchronous sensors, the local VSync timing (as configured, or Master Sync Pulse) is used to divide asynchronous sensor data into bundles by the FPGA logic. All sensor data types (both synchronous and asynchronous) for a given frame number can then be time stamped and later processed in a discrete batch, all matching the synchronous sensor data frames.

The following is a discussion of the preferred sensor data time stamping method. All sensor data either arrives in frame bundles, or is packaged into frame bundles as described above. The arrival of each frame bundle is aligned with the local Master VSync pulse as described above. Each frame is stored in local temporary memory storage buffers (e.g. FPGA Shared Memory 47) in the Logic Module 43. Each frame buffer has a corresponding timestamp latch register that is updated when the frame buffer in question is selected for new video data from a sensor or when the selected Master VSync pulse is asserted. Once a given frame has been fully captured in the local buffer (e.g. FPGA Shared Memory 47), the Local CPU 63 copies the video data (or other frame bundle) and the accompanying timestamp value and forwards it to other nodes in the system for further processing.

The following are some examples of how asynchronous sensor types may be handled. The IMU 51 preferably contains several inertial measurement sensors, and provides a repeating packet of all IMU real time measurement data multiple times per second. In order to normalize the data handling of the different sensor types, a frame structure is applied to the IMU data stream. To achieve this, the IMU packets are bundled up into frame bundles (or blocks of data) analogous to video data frames named "IMU frame bundles" and stored with a timestamp value in local temporary memory (e.g. FPGA Shared Memory 47). A number of frame buffers are allocated to the IMU 51. Preferably, the timestamp value is sampled from the local master time clock once every local VSync pulse, and latched into one or more storage registers. The timestamp (e.g. triggered by the VSync pulse) indicates the capturing of a current frame buffer of IMU readings (i.e. a frame bundle of IMU packets corresponding to one video frame, for example) within one of the frame buffers allotted to the IMU 51. As an IMU frame bundle is captured, a new frame buffer is selected, and new IMU data packets are captured there. At the same time, the previously selected frame buffer that contains a complete IMU Frame Bundle, including the timestamp, is packaged by the local processor 63 and sent to the base station.

Another example of an asynchronous sensor is the microphone array 53, which provides a continuous stream of digital audio data with no frame structure. The Logic Module 43 packages this continuous stream of digital audio data into audio frame bundles multiple times per second, preferably at the same rate as the established video frame rate. Similar to the other sensors, each frame bundle is stored into a local memory buffer within FPGA Shared Memory 47 along with a timestamp once per local frame time. The local processor 63 then packages and transfers the completed audio frame bundle to the base station along with the other sensor bundles.

Holocam Full Scene IR Illumination

The following section discusses how the present Holocam Orb system achieves holocam full scene IR illumination. The presently preferred method for infrared (IR) illumination of a scene for a Time-of-Flight (TOF) range imaging camera, such TOF 41, requires precise synchronization among the different Orbs that are monitoring the same scene in order to avoid interference among the TOF sensors in the different Orbs. Thus, the present section describes the unique features of the infrared illumination sub-module (e.g. IR illumination array 39 and/or white LED illumination array 37) found on the Time-of-flight (TOF) module 35 of the present Holocam project.

As discussed above, a Holocam Orb is an electronics and software device that gathers sensor data from a three dimensional area (scene), processes and timestamps the data, and forwards sends it to a base station for further processing in real time.

The Holocam Time-of-flight (TOF) module 35 measures the distance between objects in a three dimensional area (scene) and the TOF sensor 41. It sends out a synchronized pattern of infrared light to objects in the field-of-view (FOV) of the Holocam Orb Module, and uses a phase (or phase difference) of the reflected light to calculate the distance from an object to the sensor 41.

The presently preferred Time-of-flight method requires that the field-of-view be illuminated evenly by an infrared light source that is switching OFF and ON very quickly, preferably switching at 20 million cycles per second (i.e. at 20 MHz). Although high power IR LEDs are available, they may not be cost effective, and they currently cannot operate fast enough, for the Time-of-flight applications envisioned in the present invention. On the other hand, a single low cost IR LED will typically not produce enough infrared light energy to fully illuminate a large scene, such as is envisioned in the present invention.

Nonetheless, the present invention proposes a distributed array of low cost IR LEDs individually aligned for full coverage of a scene in an Orb's field-of-view. The number of low cost IR LEDs in this array is also dependent upon the size of the desired scene to be illuminated. The present invention further provides a method to ensure that the infrared pulses from one Holocam ORB do not interfere with the operation of other Holocam Orbs deployed in the same scene.

Figure 15:
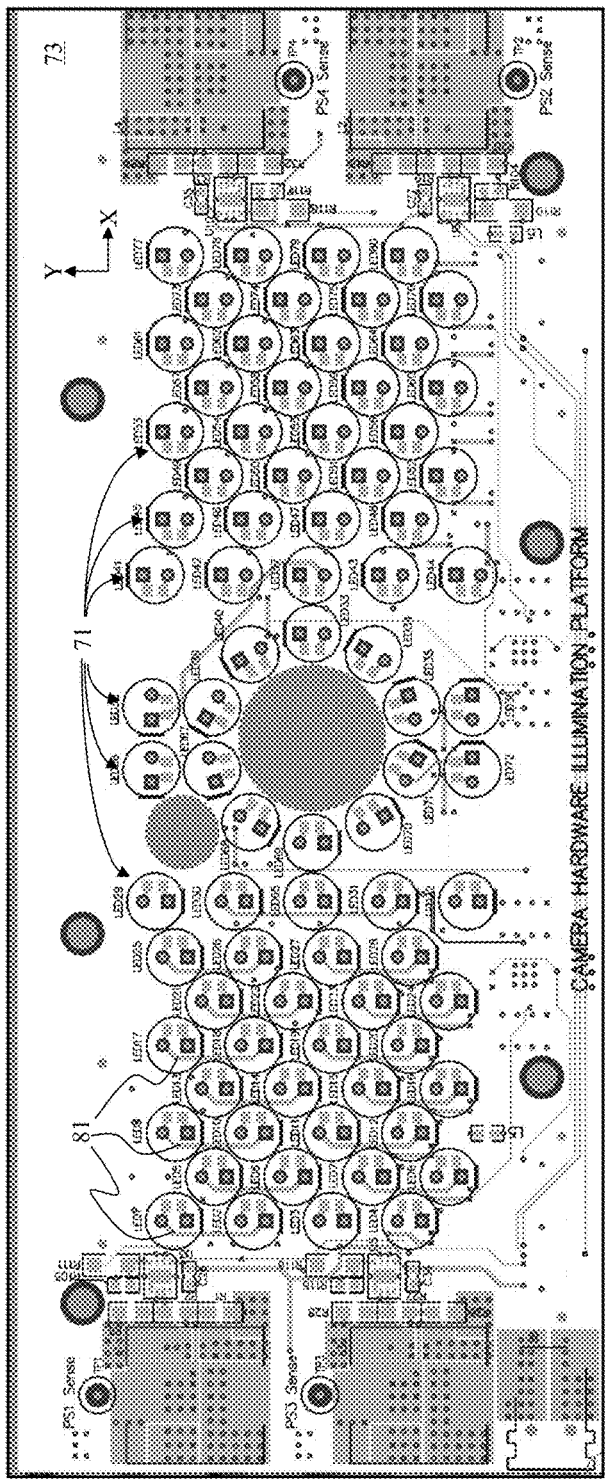
FIG. 15 shows a printed circuit board with an array of hole patterns for LEDs.

With reference to FIG. 15, multiple sources of illumination are mechanically arranged to illuminate a scene. Preferably, multiple infrared light emitting sources 71 are arranged on a circuit board 73 in such a way that they can be mechanically aimed into the scene to ensure full coverage of the area of interest.

Figure 16:
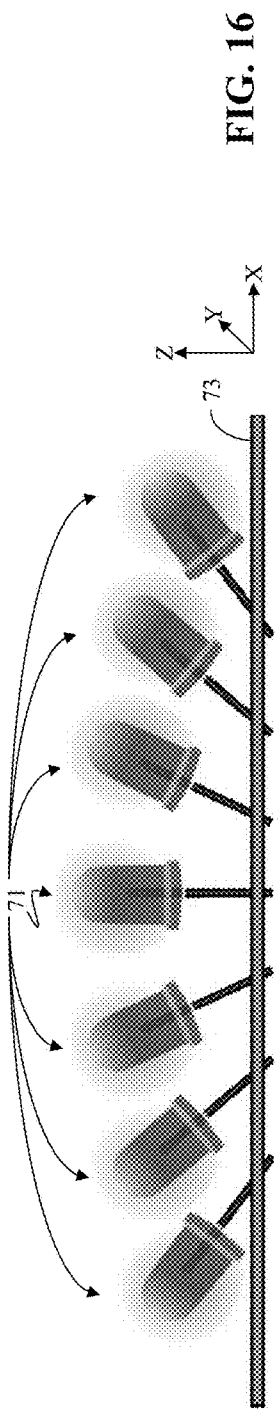
FIG. 16 illustrates drill holes at multiple installation angles.

Furthermore, since the LEDs are a two terminal device, they can only be angled perpendicular to a axis along the two terminals. Therefore as illustrated in FIG. 16, drill hole patterns in circuit board 73 for each IR LED 71 may preferably be uniquely situated on the board 73 at various angles in the XY plane of board 73, so that every section in the scene will have at least one IR LED aimed in the correct direction (i.e. in the direction of every section). That is, drill holes for each IR LED may optionally be made so that the array of IR LEDs has each IR LED pointing at a different angle when an IR LED is inserted straight (without bending) into its corresponding drill hole. In this manner each IR LED may be made to point in a different direction and thus evenly illuminate a scene. Alternatively, multiple groups of IR LEDs may be made to have the same pointing angle (i.e. have similarly angled drill holes) to provide additional illumination in specific directions.

Optionally as is illustrated in FIG. 17, some LEDs 71a may be installed with a longer than normal (i.e. typical or standard) segment of metal lead (i.e. pins) extending out from the component side of the printed circuit board in the Z plane, so that the LEDs may be individually angled (i.e. their pins bent) to aim each LED into the scene for maximum coverage. This is direct opposition to how LEDs are typically installed. Normally LEDs are installed with their plastic base (i.e. their round top) flush with the surface of the printed circuit board 73. That is, the lead is kept short enough so as to substantially prevent bending of the lead and thus prevent movement of the plastic base so as prevent the aimed direction of the LED (i.e. the plastic base) from being adjusted after manufacture.

Returning to FIG. 15, any timing skew between each LED may degrade the overall performance of the TOF module 35. A difference of 1 ns of timing skew may affect the depth perception results by 0.366 cm. Two enhancements herein proposed to the drive circuitry to reduce the timing skew. First, a high quality and low skew "Clock Distribution" amplifier is used to drive each bank of four LEDs. Secondly, signal traces 81 on the illumination printed circuit board 73 are length matched to ensure each LED is switching at the exact same time with respect to each other.

The use of a clock distribution amplifier as an LED driver circuit ensures a very low skew switching signal for each bank of four LEDs. The clock driver has a worst case skew of 50 ps. The use of trace length matching is a solution not previously used with LED light sources. LEDs placed closer to the driver circuitry have additional circuit trace length inserted to match the longer path to the furthest placed LEDs. Thus, the trace length of the closest and furthest placed LEDs is the same, and the propagation time for signals sent to each LED is thus kept constant among all the LEDs in the array.

Time Division Multiplexing

Within an individual Orb, infrared emitting light sources 71 are used to illuminate a scene (such as room 1 in FIG. 1) with structured infrared light pulses. These infrared pulses are reflected back to the TOF sensor 41. The TOF sensor then calculates the distance to objects in the scene based on the characteristics of the reflected IR pulses.

If two or more Holocam Orbs attempt to operate their respective TOF sensor system/module 35 at the same time, the infrared light pulses from the multiple Orbs will conflict with each other and distort their results.

To resolve this, the IR LED sources 39 are synchronized to their local Orb master clock and can be directed to turn ON and OFF as a unit, i.e. in unison. For example, FIG. 18 illustrates the synchronizing of a Master Sync Pulse and illumination signals for three Orbs (i.e. Holocam 1, Holocam 2 and Holocam 3) to avoid any two Orbs having their respective illumination signals active simultaneously. To achieve this, all Holocam Orbs in a Holocam Orb system are electronically synchronized to a master clock provided from a base station, as is explained above. Each Holocam Orb is assigned a unique Node ID number (for example, 1, 2, 3 etc.). Each Holocam Orb then aligns its own Master Sync Pulse to its local copy of the master clock, as is also explained above. Each Holocam Orb is then configured to only send out Time-of-flight illumination pulses in its own allocated time slice, as determined by its Node ID.

Since all Orbs in a scene are time synchronized, each Orb can be configured to only illuminate the scene with IR pulses for a portion of a cycle time. Only one Orb will illuminate the scene at a time, thus no interference will occur between Orbs.

Hardware FOV Cropping

The following section discusses a method for field-of-view cropping in a Holocam Orb. That is, this section describes the electronic methods of field-of-view (FOV) cropping in the Holocam Orb.

In some modes of operation, multiple frame-based data sensors are deployed to gather data from a similar viewpoint in a scene. The sensors may, or may not, have the exact same field-of-view. In some applications, the Holocam system can be configured to only provide a Minimum Common Field of View, which consists of only the common overlapping data (i.e. FOV) from all participating sensors. The benefit is that the system will only process and transmit the useful subset of the data from the participating sensors in the Holocam Orbs.

To achieve this, it is presently proposed to use of a programmable digital logic device (FPGA) (or other digital signal processor or processing unit) to manage the simultaneous processing of multiple sensor data streams to enable cropping to operate in real time, reducing the software processing requirements of the Holocam system. In terms of architecture, each Holocam Orb may offer sensors that gather visual data from a given three dimensional area (scene) and arrange it into discrete frames, several times per second. In one configuration, there are three sensors that gather visual data in the form of an array of values, several times per second. Two of the three sensors are the two RGB sensors 33 and 31, which both gather visible light image data and present it to their Orb as a sequence of discrete colour images. The third sensor is Time-of-flight (TOF) sensor 41, which gathers reflected infrared light and presents a two dimensional depth array representing the distance from the TOF sensor to objects in the scene. It is emphasized that optical lens configuration and sensor geometry is different between the RGB and the TOF sensors.

To achieve correct cropping, each sensor is assigned a left, right, top and bottom pixel cropping register that can be set by system software. These values control the cropping logic for the given sensor and (when enabled) will truncate the unwanted pixels for the sensor that are outside the usable FOV. The following is a preferred method to configure and run the cropping logic.

Figure 19:
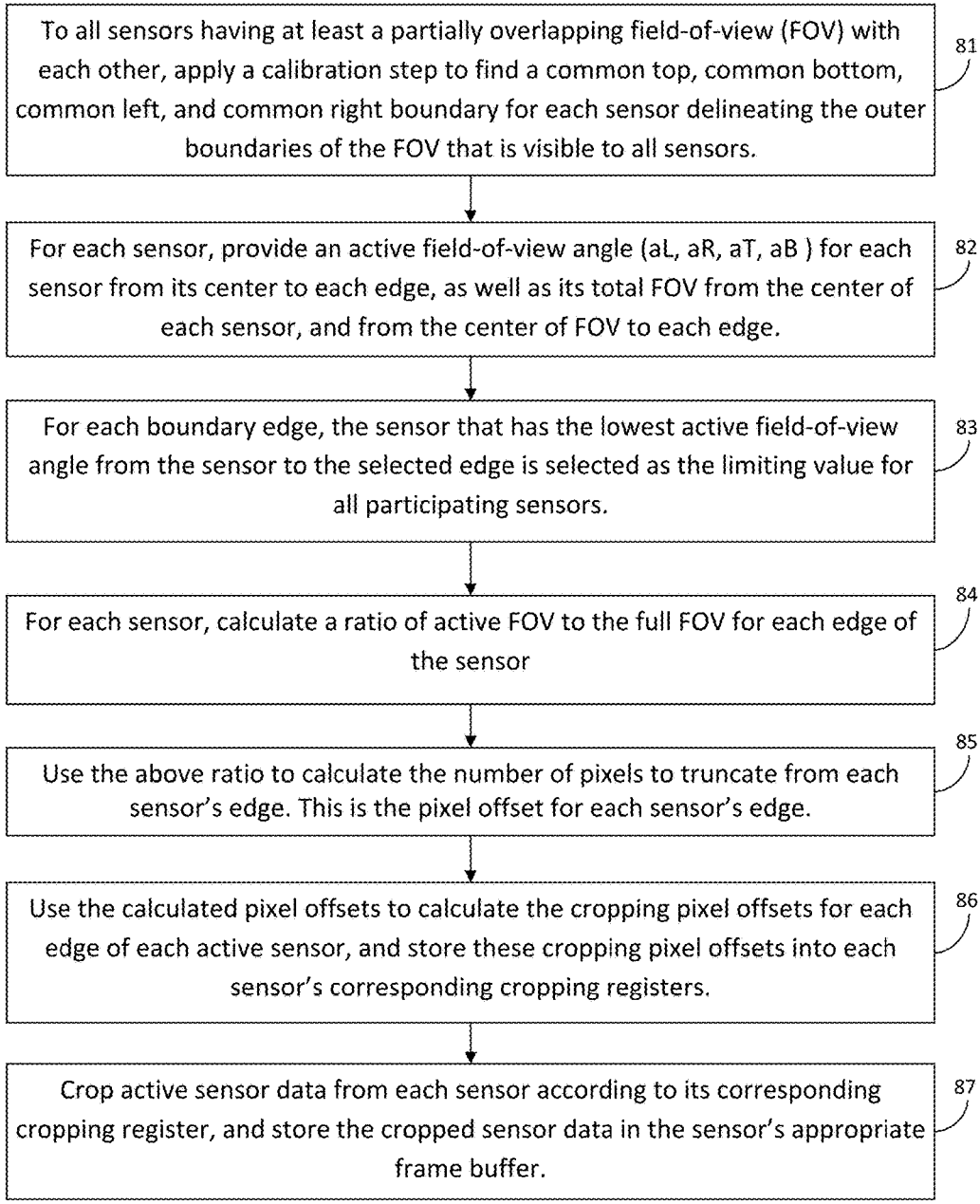
FIG. 19 illustrates a flow chart for setting an active FOV for each of multiple imaging sensors and depth perception sensors.

With reference to FIG. 19, a calibration step 81 is first taken to find the common top, bottom, left and right boundaries (e.g. edge) of each sensor that are visible in all three sensors. Any known calibration technique for calibrating multiple cameras, or imaging devices, may be used. As shown in step 82, the result of this calibration will provide an active field-of-view angle (aL, aR, aT, aB) for each sensor from its center to each edge, as well as a sensor's total angle of view (total FOV) from the center of each sensor, and from the center of FOV to each edge. In step 83, for each edge (i.e. each edge is selected in turn), the sensor that has the lowest angle view (e.g. the lowest active field-of-view angle) from the sensor to the currently selected edge provides a "worst case" scenario and is selected as the limiting value for all participating sensors. The active FOV may be adjusted according to the determined limiting values for the edges. In step 84, a ratio of the active FOV to the full FOV for each sensor's edge is calculated. The number of pixels to truncate from each sensor's edge is then calculated using this calculated ratio, as shown in step 85. This truncating basically defines pixel offsets. In step 86, the calculated pixel offsets are then used to calculate the cropping pixel offsets for each edge of each active sensor, and are programmed into appropriate cropping registers. Pixel data then flows through the cropping logic and is stored in memory buffers, e.g. FPGA Shared Memory 47. At this point, all the selected sensor data arrays have been cropped to the same minimum common FOV. The Local CPU 63 can then access the memory buffers to copy and share the data with the rest of the Holocam Orb System installation.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

What is claimed is:

1. A environment sensing apparatus, comprising:
at least one synchronous sensor characterized by:
  (a) having a trigger input that actuates a start of a synchronous-data gathering cycle that captures first sensor data, and synchronously aligns its synchronous-data gathering cycle to the trigger input;
  (b) organizing the first sensor data captured during each synchronous-data gathering cycle into a corresponding data frame, and
  (c) issuing a frame-completion signal in response to completion of each data frame;
at least one asynchronous sensor characterized by generating a continuous stream of second sensor data and lacking any input for aligning its second sensor data to any external clock source; and
a first memory space and a second memory space, both first memory space and second memory space being coupled to selectively store second sensor data from the at least one asynchronous sensor;
wherein:
both the first memory space and second memory space are responsive to the frame-completion signal of the at least one synchronous sensor, the first memory space and second memory space are configured to alternate operation in accordance with the frame-completion signal, and only one of the first memory space and second memory space stores second sensor data from the at least one asynchronous sensor at a time to define discrete second sensor data groups each corresponding to a separate data frame in accordance with the frame-completion signal; and
each data frame from the least one synchronous sensor is bundled with its corresponding second sensor data group stored in one of the first and second memory spaces to define a data frame bundle, and the defined data frame bundles are output from the environment sensing apparatus.

2. The environment sensing apparatus according to claim 1, further comprising:
a first video sensor and a second video sensor, each of the first video sensor and second video sensor being one of said at least one synchronous sensor;
a time-of-flight (TOF) sensor having an actuation input that triggers the TOF sensor to start a TOF-data gathering cycle;
wherein the actuation input of the TOF sensor, the trigger input of the first video sensor, and the trigger input of the second video sensor are coupled to response to a clocking source, in common;
wherein:
the first video sensor and second video sensor are spaced apart to define a stereoscopic image sensor pair that together captures stereoscopic pairs of 2D images, the stereoscopic image sensor pair having a first field-of-view (FOV); and
the TOF sensor is positioned between the spaced apart first video sensor and second video sensor, and the TOF sensor is aimed in the direction of the first FOV.

3. The environment sensing apparatus according to claim 2, wherein the TOF sensor defines a 3D point cloud, and points within the 3D point cloud are associated with corresponding pixels in captured stereoscopic pairs of 2D images.

4. The environment sensing apparatus according to claim 2, wherein the at least one asynchronous sensor is an Inertial Measurement Unit (IMU), temperature sensor, magnetic field strength sensor, or magnetic field alignment sensor.

5. The environment sensing apparatus according to claim 2, wherein the frame-completion signal is a VSync signal that signals the capturing of a current image frame by at least one of the first video sensor and second video sensor.

6. The environment sensing apparatus according to claim 2, further comprising a circuit board having an array of light emitting diodes (LEDs), each LED having an illuminating head supported over a surface of the circuit board on at least one connection lead spanning from the illumination head to a drill hole in the circuit board, the illuminating head being aimed at a predefined angle relative to the surface of the circuit board and the drill hole being at the same predefined angle in the circuit board, the predefined angle not being perpendicular to the surface of the circuit board.

7. An environment sensing system comprising a plurality of environment sensing apparatuses of claim 5, further comprising:
   a master clock distributed to all of said plurality of environment sensing apparatuses, each environment sensing apparatus coupling its received master clock to its respective trigger input so as to substantially synchronize a simultaneous operation of its respective first video sensor, second video sensor, and TOF sensor with the operation of the first video sensor, second video sensor, and TOF sensor of all other of said environment sensing apparatuses;
   wherein the internal issuance of the VSync signal within each environment sensing apparatus is substantially simultaneous across all environment sensing apparatuses, and the creation of data frame bundles across all environment sensing apparatuses is likewise simultaneous.

8. The environment sensing system of claim 7, wherein each environment sensing apparatus within said environment sensing system further comprises:
   an array of light emitting diodes (LEDs) operational for a predefined sub-period, said predefined sub-period being a fraction a full period defined as a time of one TOF-data gathering cycle, said predefined sub-period being further characterized by a time offset from the beginning of each TOF gathering cycle;
   wherein the time offset of each environment sensing apparatus is different and selected to prevent any two environmental sensing apparatus from having their respective array of light emitting diodes operational at the same time.

9. The environment sensing system of claim 7, wherein:
   the FOV of each environment sensing apparatus has a partially overlapping FOV segment in common with all other environment sensing apparatuses in said environment sensing system; and
   within each environment sensing apparatus, its data frame bundles exclude any sensor data not corresponding to the overlapping FOV segment.

10. The environment sensing system of claim 9, wherein:
   each environment sensing apparatus further includes a data processing unit;
   within each environment sensing apparatuses, the overlapping FOV segment is defined by an upper boundary imaging cut-off line, a lower boundary imaging cut-off line, a left boundary imaging cut-off line, and a right boundary imaging cut-off line; and
   within each environment sensing apparatus, its data processing unit defines a respective upper boundary imaging cut-off line, a lower boundary imaging cut-off line, a left boundary imaging cut-off line, and a right boundary imaging cut-off line by a sequence of steps including:
   (a) all imaging sensors of each respective, individual environment sensing apparatus are calibrated to identify their respective, local common top, bottom, left and right boundaries defining a local, common FOV (active FOV) for each imaging sensors of the individual environmental sensing apparatus;
   (b) from the active FOV, define an active left boundary, active right boundary, active top boundary and active bottom boundary corresponding to the active FOV each sensor from its center to each active boundary, define each image sensor's total FOV from the center of each sensor;
   (c) for all participating imaging sensors, for each of a top, bottom, left and right boundary, each selected in turn, the imaging sensor that has the lowest active FOV angle from the imaging sensor to the currently selected boundary is selected as the limiting value for all participating imaging sensors;
   (d) the active FOV is adjusted according to the determined limiting values for the boundaries;
   (e) determine a ratio of the active FOV to the full FOV for each imaging sensor's boundary;
   (f) use the ratio of step (e) to calculate a number of pixels to truncate from each imaging sensor's view boundary, this number of pixels to truncate being a respective pixel offset for each imaging sensor's view boundary; and
   (g) store each imaging sensor's respective pixel offsets into an truncate memory space associated with each imaging sensor.

11. The environment sensing system of claim 7, wherein:
   each data frame bundle created within a respective environment sensing apparatus is given a respective time stamp, and the data frame bundles across all environment sensing apparatuses in the environment sensing system that are constructed in unison are given the same time stamp; and
   all environmental sensing apparatuses within the environment sensing system are connected via a computer network.

12. The environment sensing system of claim 11, wherein each environment sensing apparatus forwards its data frame bundles to another environment sensing apparatus in the environment sensing system.

13. The environment sensing system of claim 11, further having a central computer system connected to the computer network, wherein:
   each environment sensing apparatus forwards its data frame bundles to the central computer system; and
   the central computer system coordinates all incoming data frame bundles according to their respective time stamps.

14. The environment sensing system of claim 7, wherein:
   each environment sensing apparatus is an independent three-dimensional (3D) sensing apparatus including multiple 3D sensors; and
   the environment sensing system is part of an augmented reality system.

15. An augmented reality system comprising:
   a computer network;
   a central computer coupled to the computer network; and
   a plurality of independent three-dimensional (3D) sensing apparatuses, each coupled to the computer network, wherein each 3D sensing apparatus includes:

(i) stereoscopic image sensor pair including first video sensor spaced apart from a second video sensor configured to capture stereoscopic pairs of 2D images, the stereoscopic image sensor pair having a first field-of-view (FOV), the first and second video sensors being responsive to a trigger input, in common, that actuates the start of a stereoscopic image capture sequence capture one 3D image frame, and stereoscopic image sensor pair issuing a VSync signal at the completion of each captured 3D image frame;

(ii) a time-of-flight (TOF) sensor having an actuation input that triggers the TOF sensor to start a TOF-data gathering cycle to collect TOF data, the actuation input of the TOF sensor being tied to the trigger input of the stereoscopic image sensor pair, the TOF data gathered during one 3D image frame being termed a TOF frame, the TOF sensor being aimed in the direction of the first FOV;

(iii) at least one asynchronous sensor characterized by generating a continuous stream of asynchronous sensing data and lacking any input for aligning its asynchronous sensing data to any external clock source;

(iv) a first memory space and a second memory space, both first memory space and second memory space being coupled to selectively store asynchronous sensing data from the at least one asynchronous sensor, the first memory space and second memory space being configured to alternately store asynchronous sensing data from the at least one asynchronous sensor in accordance with the VSync signal to define discrete asynchronous data groups each corresponding to a different 3D image frame, in accordance with the VSync signal; and (v) a data processing unit configured to provide a time stamp, in common, to each 3D image frame, TOF frame, and asynchronous data group in response to the VSync signal, and to collect the 3D image frames, TOF frames, and asynchronous data groups into data frame bundles in accordance with their common time stamps, and to output the collected data frame bundles to the central computer over the computer network.

16. The augmented reality system according to claim 15, wherein the TOF sensor defines a 3D point cloud, and points within the 3D point cloud are associated with corresponding pixels in captured stereoscopic pairs of 2D images.

17. The augmented reality system according to claim 15, wherein the at least one asynchronous sensor is an Inertial Measurement Unit (IMU), temperature sensor, magnetic field strength sensor, or magnetic field alignment sensor.

18. The augmented reality system according to claim 15, further comprising a master clock distributed over said computer network to all 3D sensing apparatuses, wherein each 3D sensing apparatus couples its received master clock to its respective trigger input;
wherein the internal issuance of each 3D sensing apparatus's Vsync signal is substantially simultaneous across all 3D sensing apparatus, and time stamps of simultaneously created data frame bundles across all 3D sensing apparatus are the same.

19. The augmented reality system according to claim 15, wherein each 3D sensing apparatus further comprises:
an array of light emitting diodes (LEDs) operational for a predefined sub-period, said predefined sub-period being a fraction a full period defined as a time of one TOF-data gathering cycle, said predefined sub-period being further characterized by a time offset from the beginning of each TOF gathering cycle;
wherein the time offset of each 3D sensing apparatus is different and selected to prevent any two 3D sensing apparatus from having their respective array of light emitting diodes operational at the same time.

20. The augmented reality system according to claim 15, wherein:
the FOV of each 3D sensing apparatus has a partially overlapping FOV segment in common with all other 3D sensing apparatus; and
within each 3D sensing apparatus, its data frame bundles exclude any sensor data not corresponding to the overlapping FOV segment.

* * * * *